(12) United States Patent
Negishi

(10) Patent No.: US 6,462,830 B1
(45) Date of Patent: *Oct. 8, 2002

(54) IMAGE PROCESSING APPARATUS AND METHOD, IMAGE FORMING SYSTEM, IMAGE FORMING APPARATUS AND METHOD

(75) Inventor: Akira Negishi, Fujisawa (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/624,807

(22) Filed: Mar. 27, 1996

(30) Foreign Application Priority Data

Mar. 31, 1995 (JP) .............................. 7-076580

(51) Int. Cl.$^7$ ................................ G06F 3/12
(52) U.S. Cl. ................... 358/1.12; 358/1.8; 358/1.1; 358/1.15
(58) Field of Search .................... 395/111, 108, 395/109, 115, 116, 114; 358/444, 447, 448, 498, 502, 503, 1.8, 1.12, 1.13

(56) References Cited

U.S. PATENT DOCUMENTS

| | | | | |
|---|---|---|---|---|
| 4,933,772 A | | 6/1990 | Ikenoue et al. | 358/300 |
| 4,992,882 A | | 2/1991 | Ikenoue et al. | 358/300 |
| 5,066,973 A | * | 11/1991 | Kuwabara | 355/27 |
| 5,079,722 A | * | 1/1992 | Ogawa | 395/111 |
| 5,163,123 A | * | 11/1992 | Kadano | 395/116 |
| 5,167,014 A | | 11/1992 | Shimomura | 395/111 |
| 5,208,902 A | * | 5/1993 | Kumon | 395/116 |
| 5,229,866 A | * | 7/1993 | Kashiwagi et al. | 358/444 |
| 5,258,779 A | * | 11/1993 | Serizawa et al. | 395/111 |
| 5,371,873 A | * | 12/1994 | Niwa | 395/425 |
| 5,408,304 A | * | 4/1995 | Serizawa | 395/111 |
| 5,455,603 A | * | 10/1995 | Hori et a. | 358/1.12 |
| 5,471,322 A | * | 11/1995 | Murata | 395/115 |

FOREIGN PATENT DOCUMENTS

| | | |
|---|---|---|
| DE | 4132847 | 5/1972 |
| EP | 0443494 | 8/1991 |
| EP | 0681265 | 11/1995 |
| JP | 63251247 | 1/1988 |
| JP | 2-011377 | 1/1990 |

* cited by examiner

*Primary Examiner*—Mark Wallerson
(74) *Attorney, Agent, or Firm*—Fitzpatrick, Cella, Harper & Scinto

(57) ABSTRACT

An image forming system in which a PDL controller develops a raster image from entered PDL image data and sends a number Pr of items of prepared raster image data to a copier together with the raster image data and the number of copies of images to be formed. On the basis of the raster image data received, the copier forms images on recording paper, with the number of images being equivalent to the number of copies to be formed. The copier compares a number Pf of sheets of recording paper supplied to an image forming unit with the number Pr at a predetermined timing. If Pr>Pf holds true, then the copier supplies a new sheet of recording paper to continue a continuous printing operation. Otherwise, the copier halts the supply of recording paper, stops the continuous printing operation and so notifies the PDL controller.

14 Claims, 20 Drawing Sheets

FIG. 7
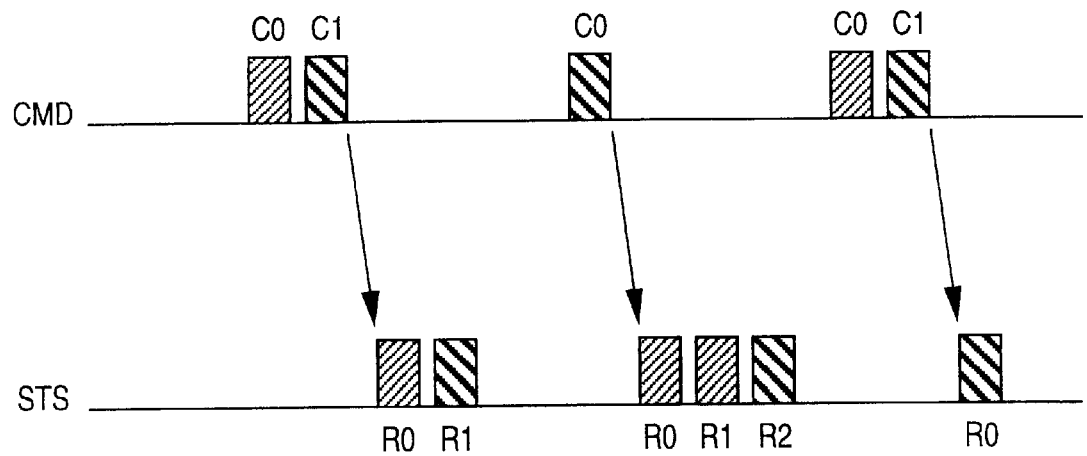
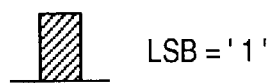 LSB = '1'
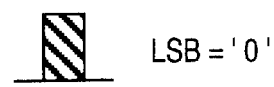 LSB = '0'
C0, C1... : COMMANDS ( PDL CONTROLLER → COPIER)
R0, R1... : RESPONSES ( COPIER → PDL CONTROLLER)

CONFIGURATION COMMANDS / RESPONSES

|      | D7 | D6 | D5 | D4 | D3 | D2 | D1 | D0 |     |
|------|----|----|----|----|----|----|----|----|-----|
| C0   | 0  | 0  | 0  | 0  | 0  | 0  | 1  | 1  | 03H |

| C1 | CONTROLLER TYPE | 1 |

| C2 | CONTROLLER ROM VERSION | 0 |

|      | D7  | D6 | D5 | D4 | D3 | D2 | D1 | D0 |
|------|-----|----|----|----|----|----|----|----|
| R0   | A/N | DEVICE TYPE            || || || || 1 |

| R1 | NOT USED | CS | MF | DP | 0 |

- DOUBLE-SIDED PRINTING FUNCTION?
- MANUAL FEED FUNCTION?
- NUMBER OF CASSETTES

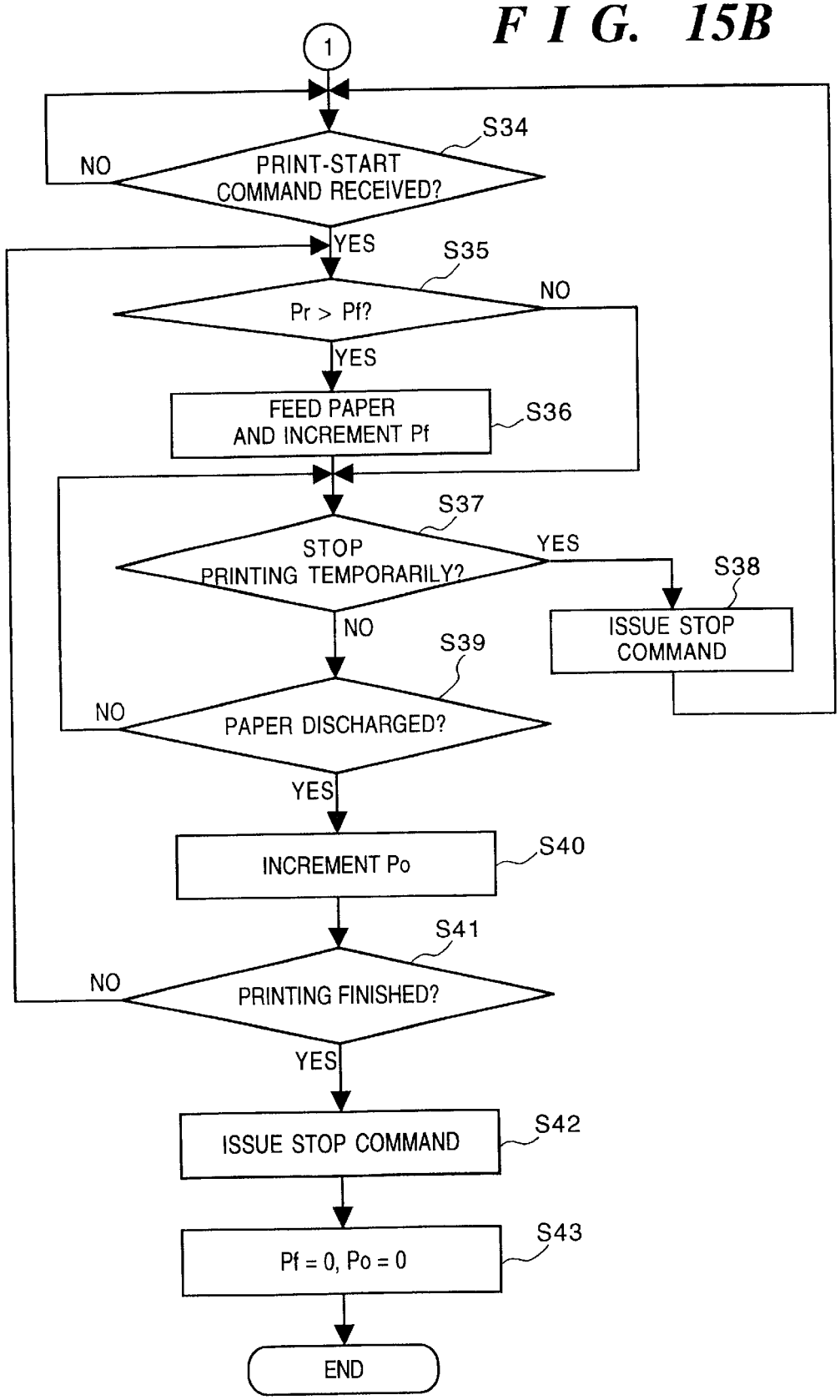

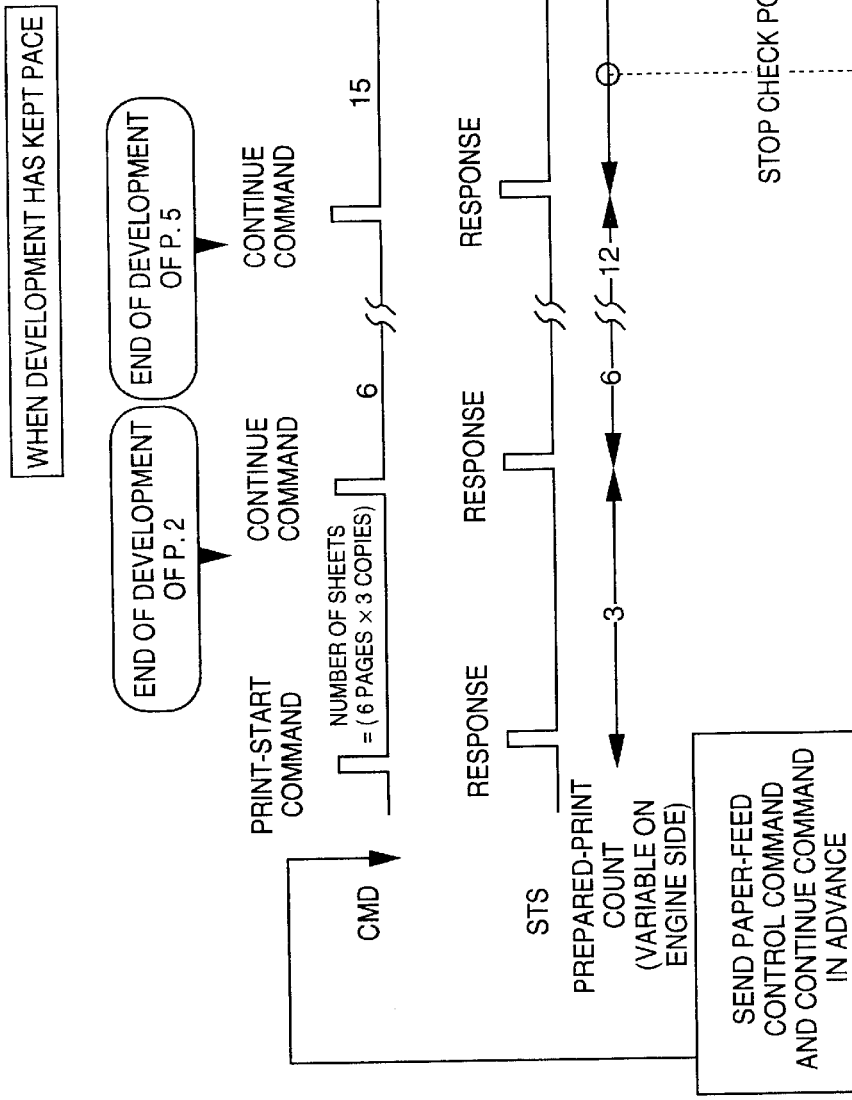

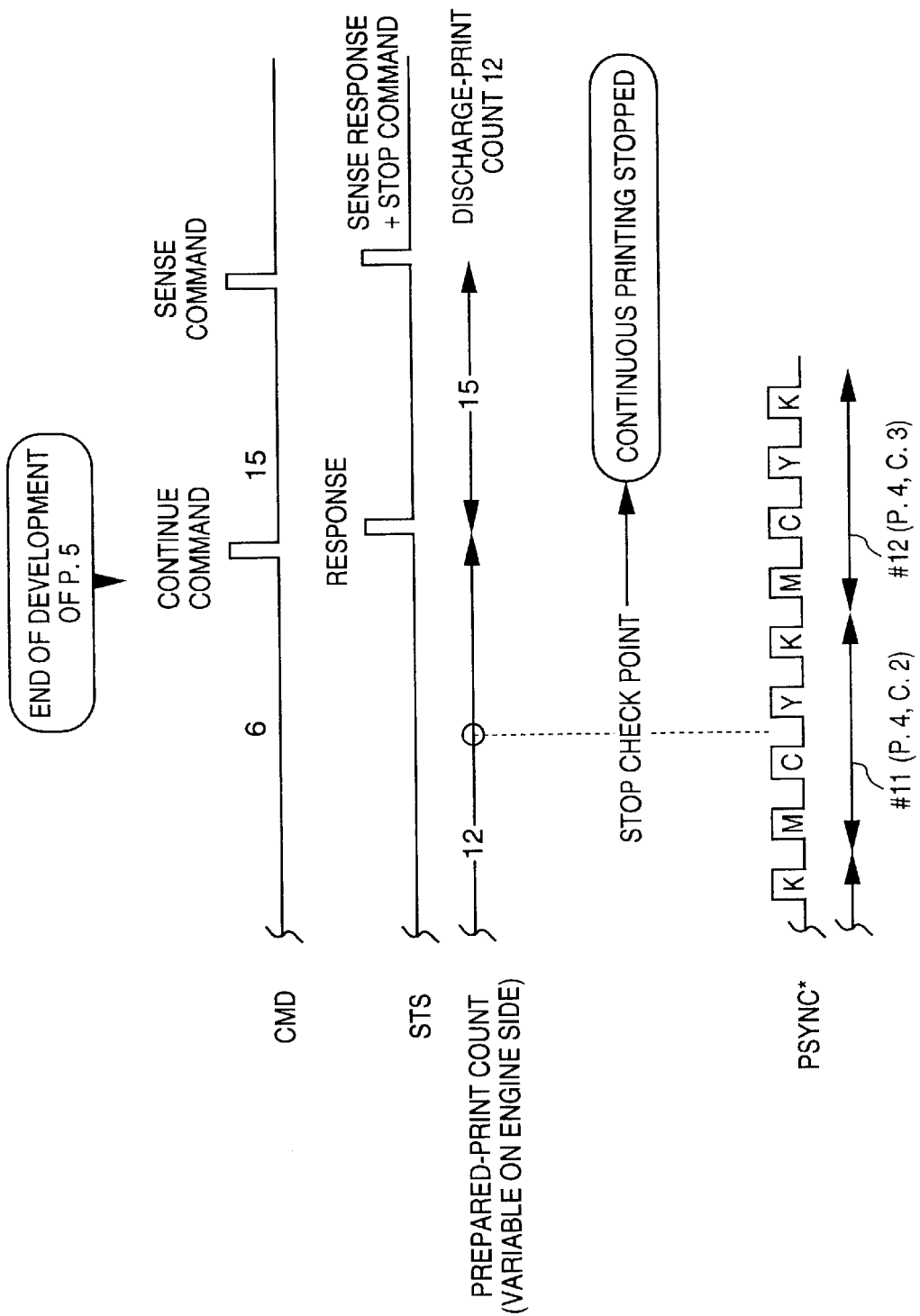

IMAGE PROCESSING APPARATUS AND METHOD, IMAGE FORMING SYSTEM, IMAGE FORMING APPARATUS AND METHOD

BACKGROUND OF THE INVENTION

1. Field of the Invention

This invention relates to an image processing apparatus and method as well as an image forming system, apparatus and method. More particularly, the invention relates to an image processing apparatus and method as well as an image forming system, apparatus and method having a function for developing image data described in page description language, by way of example.

2. Description of the Related Art

When a printing job extending over several pages is to be handled by a printer having a PDL (page description language) controller for developing image data described in PDL, the raster image data for all of the pages cannot always be stored in a frame memory that is for the purpose of storing the raster image data after development. Accordingly, while one page is being printed, the printer develops the PDL data for subsequent pages. The time required to develop PDL data depends upon the content of the image; the more complicated the image, the longer the time required. This means that if the development of the PDL data is not finished by the time the printing of the preceding page ends, the printer engine is halted temporarily and restarted once the development of the PDL data has been completed.

When the printer engine is temporarily halted, a transition is made to a stopping operation referred to as "backward rotation". Then, when printing is started again, a transition is made to a starting operation referred to as "forward rotation" and to a paper-feed operation. Consequently, even if printing is restarted immediately after the temporary halting of the printer engine, total printing time is much longer than it would be for a continuous printing operation. This results in a conspicuous decline in performance in a case where a copier having a long paper path from the cassette to the transfer drum and fixing unit is used as the printer.

Since a frame memory for raster images is high in cost, a frame memory capable of storing a large number of pages at one time is not provided. In addition, the time required for developing PDL data is longer than that required for printing. For these reasons, many printers always halt the operation of the printer engine between pages. Alternatively, a method is adopted in which the printer engine initially is instructed to perform a printing job consisting of a sufficiently large number of pages and the printer engine is halted temporarily if the development of the PDL data fails to keep pace.

The recent decline in the cost of DRAMs of larger storage capacity has been accompanied by the potential for frame memories capable of storing a large number of pages. In addition, the time needed to develop PDL data is being made shorter by high-speed CPUs of RISC type. With this as a background, it is hoped that total printing time will be shortened by executing continuous printing achieved by halting the printer engine as little as possible.

However, the following problem arises in the art described above:

With the method of instructing the printer engine to perform a printing job consisting of a sufficiently large number of pages, the PDL controller must judge whether the printer engine is to be stopped or not. As a consequence, control becomes extremely complicated in a case where the paper-feed cassettes are arranged in three or four stages and the timing at which paper feed starts is different for each cassette stage, or in a case where the paper is fed in advance to color image developed by a printer controller. Further, if the printer-engine stop command is not issued by the PDL controller for some reason, the printer engine will output blank paper.

SUMMARY OF THE INVENTION

Accordingly, an object of the present invention is to provide an image forming apparatus, as well as a controller for the same, in which total printing time can be shortened by simple control.

Another object of the present invention is to provide an image forming apparatus, as well as a controller for the same, in which even if a printer engine for performing advance feed of paper is made to perform a printing job, total printing time can be shortened by simple control.

A further object of the present invention is to provide an image forming apparatus, as well as a controller for the same, in which the output of a recording medium, fed in advance, without the formation of an image thereon is prevented by simple control.

According to the present invention, an image forming apparatus of a preferred embodiment that attains the foregoing object comprises generating means for successively generating at least one page of image data from entered image information and outputting the number of copies of images formed based upon these image data, first counting means for successively counting the number of image data generated by the generating means and for outputting a first count value, image storage means for storing at least one page of the image data generated by the generating means, formed-copy count storage means for storing the number of formed copies outputted by the generating means, forming means for forming images, the number of which is the number of formed copies stored in the formed-copy count storage means, on a supplied recording medium based upon the image data stored in the image storage means, second counting means for counting the number of recording media that have been supplied to the forming means and outputting a second count value, and control means comparing the first count value and the second count value at a predetermined timing and controlling the supply of the recording medium to the forming means in dependence upon results of the comparison.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a diagram for describing the communication protocol for communication between the PDL controller and copier illustrated in FIG. 1;

FIGS. 15A, 15B are flowcharts illustrating an example of a printing sequence;

FIGS. 16A, 16B are diagrams for describing an example of continuous printing according to this embodiment;

DESCRIPTION OF THE PREFERRED EMBODIMENTS

Embodiments of an image forming apparatus according to the present invention will now be described in detail with reference to the drawings.

First Embodiment

A first embodiment described below is a printing system comprising a PDL controller and a copier.

Overall System

Figure 1:
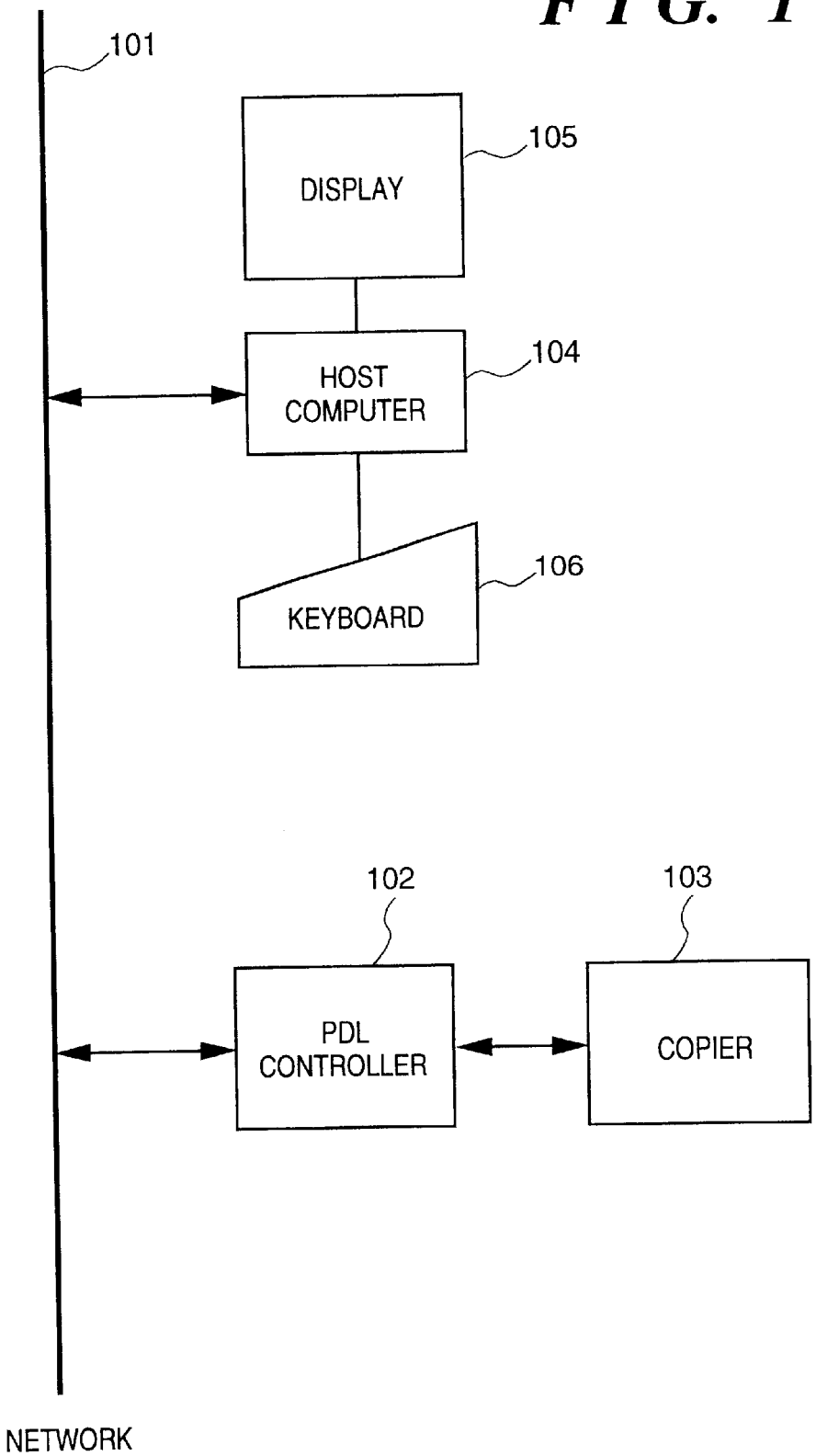
FIG. 1 is a diagram showing the construction of a system according to a first embodiment of the present invention.

FIG. 1 is a diagram showing the construction of the system according to the first embodiment. As shown in FIG. 1, a host computer 104 comprising, say, a personal computer or a work station and a PDL controller 102 are connected via a network 101.

The host computer 104 has a display 105 and a keyboard 106 and is capable of using a copier 103, which is connected to the PDL controller 102, as a printer via the network 101. In other words, application software and driver software run by the host computer 104 send PDL data to the PDL controller 102 via the network 101. The PDL controller 102 interprets the PDL data received, develops a raster image (pixel-by-pixel image data) in an internal memory, sends the raster image to the copier 103 and causes the copier to print out the image. It should be noted that the network 101 may employ a TCP/IP protocol.

Host Computer

Figure 2:
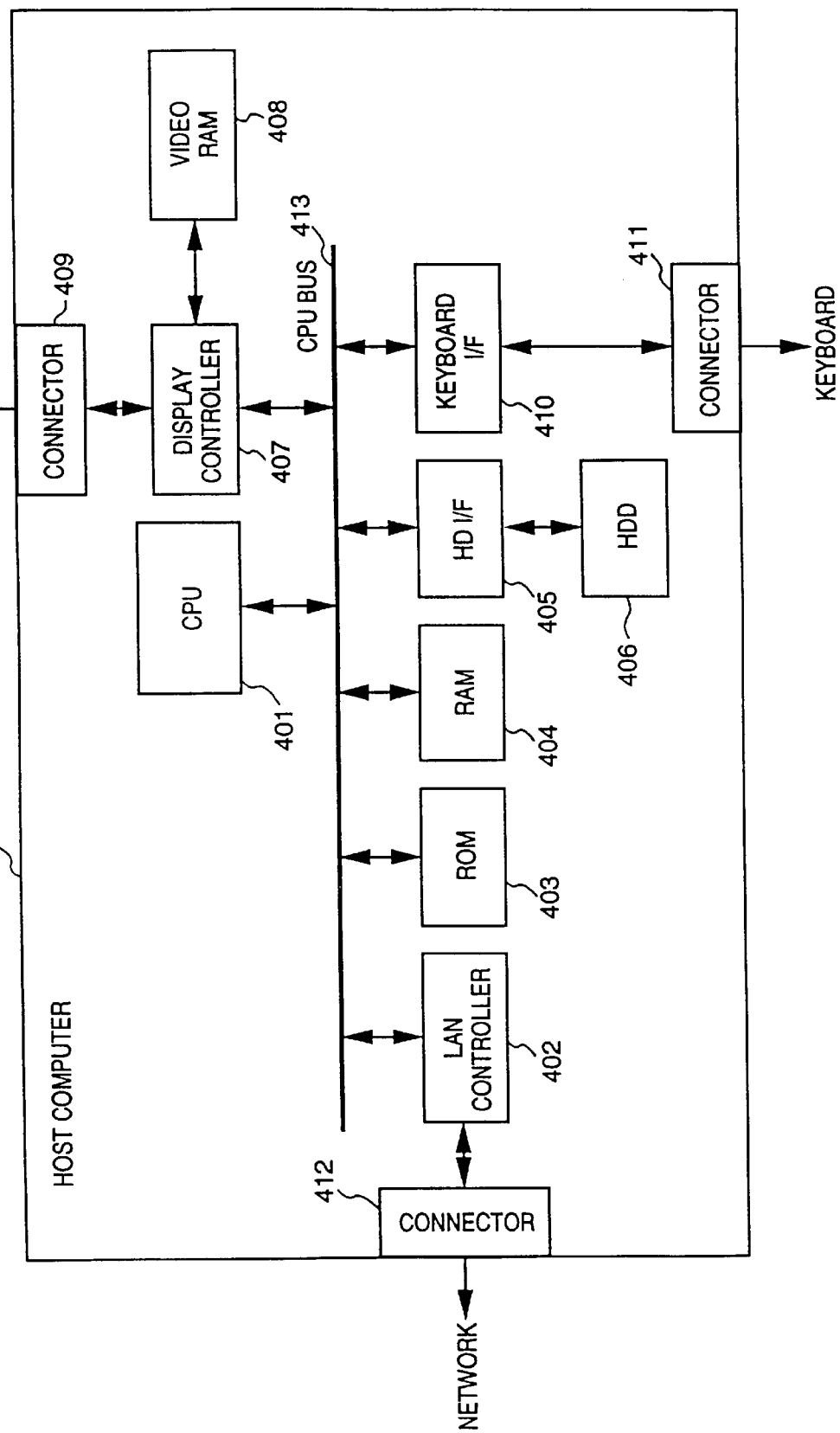
FIG. 2 is a block diagram showing the internal construction of a host computer illustrated in FIG. 1.

FIG. 2 is a block diagram illustrating the internal construction of the host computer 104.

As shown in FIG. 2, the host computer has a CPU 401 connected to each of the components, described below, via a CPU bus 413, exchanges data with these components and controls them. In addition, the CPU 401 executes programs such as application software. A processing program for start-up and various data are stored in a ROM 403 in advance. A RAM 404 is utilized by the CPU 401 to save working data and the like.

A hard disk (HD) 406 in which various software and data have been saved is connected via a hard-disk interface (HD-I/F) 405. A LAN controller 402 is connected to the network 101 via a connector 412. A keyboard interface 410 is connected to the keyboard 106 via a connector 411 and receives key inputs from the keyboard 106. A display controller 407 stores an image, which has been received via the CPU bus 413, in a video RAM 408, sends the image that has been stored in the video RAM 408 to the display 105 via a connector 409 and causes the display 105 to display the image.

PDL Controller

Figure 3:
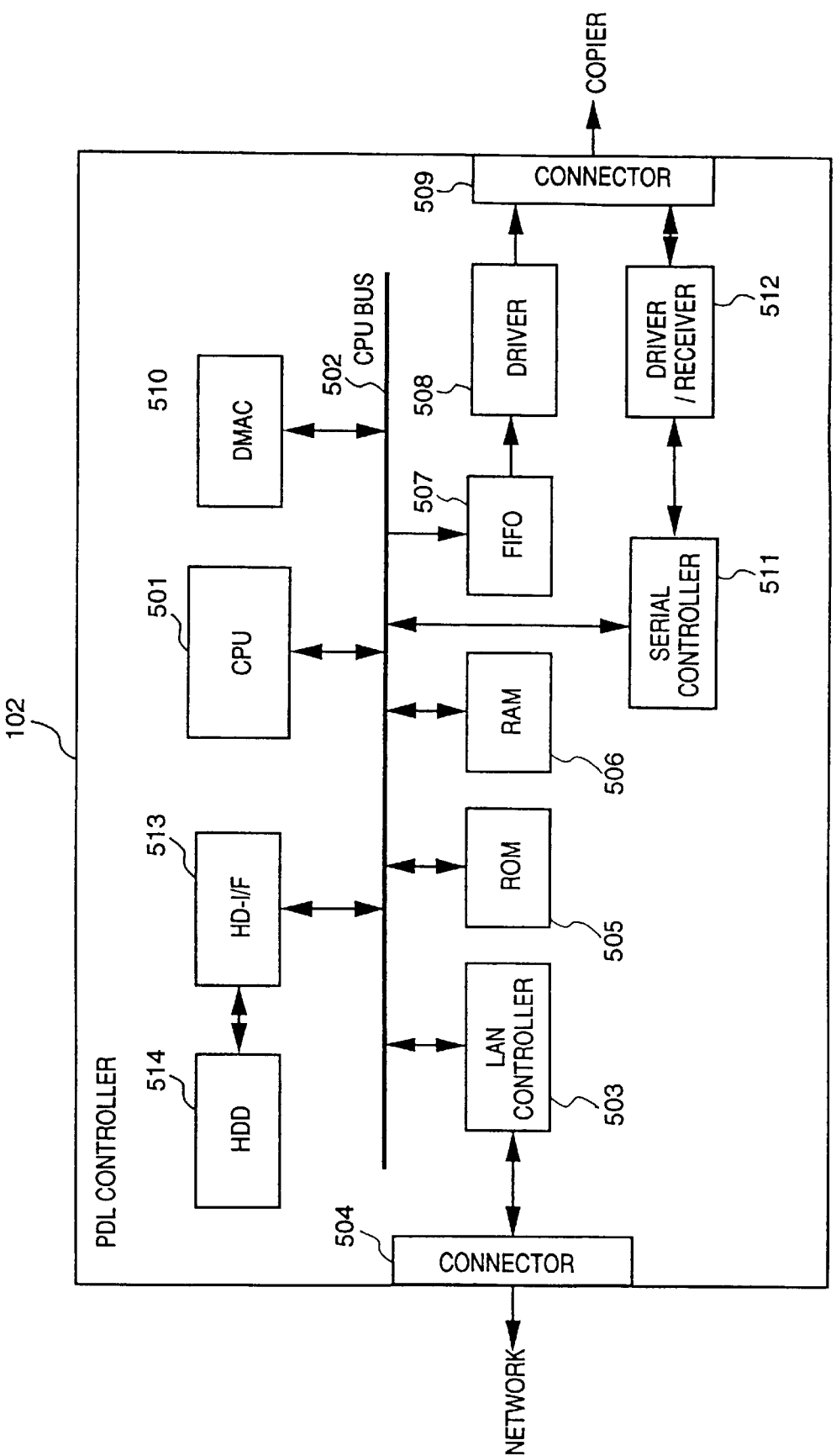
FIG. 3 is a block diagram showing the internal construction of a PDL controller illustrated in FIG. 1.

FIG. 3 is a block diagram showing the internal construction of the PDL controller 102.

As shown in FIG. 3, the PDL controller 102 includes a CPU 501 connected to each of the components, described below, via a CPU bus 502, exchanges data with these components and controls them. In addition, the CPU 501 interprets PDL data and develops a raster image. PDL data include a paint command, character data, image data for each pixel and compressed image data, etc.

A processing program for start-up, a program for developing the PDL data and various data, especially font data, are stored in a ROM 505 in advance. A RAM 506 is utilized by the CPU 501 to save raster images and the like.

A hard disk (HD) 514 in which font data and the like have been saved is connected via a hard-disk interface (HD-I/F) 513. The HD-I/F 513 is a general-purpose interface such as an SCSI, IDE, GPIB, etc.

A LAN controller 503 is connected to the network 101 via a connector 504. A DMA (direct memory access) controller 510 transfers a raster image, which has been stored in the RAM 506, to a FIFO (first-in, first-out) memory 507. The raster image that has been transferred to the FIFO 507 is sent to the copier 103, via a driver 508 and a connector 509, where the image is printed out. In order to perform such transfer control, the DMA 510 performs serial communication with the copier 103 via a connector 509 using a serial controller 511 and a driver/receiver 512.

Circuit Arrangement of Copier

Figure 4:
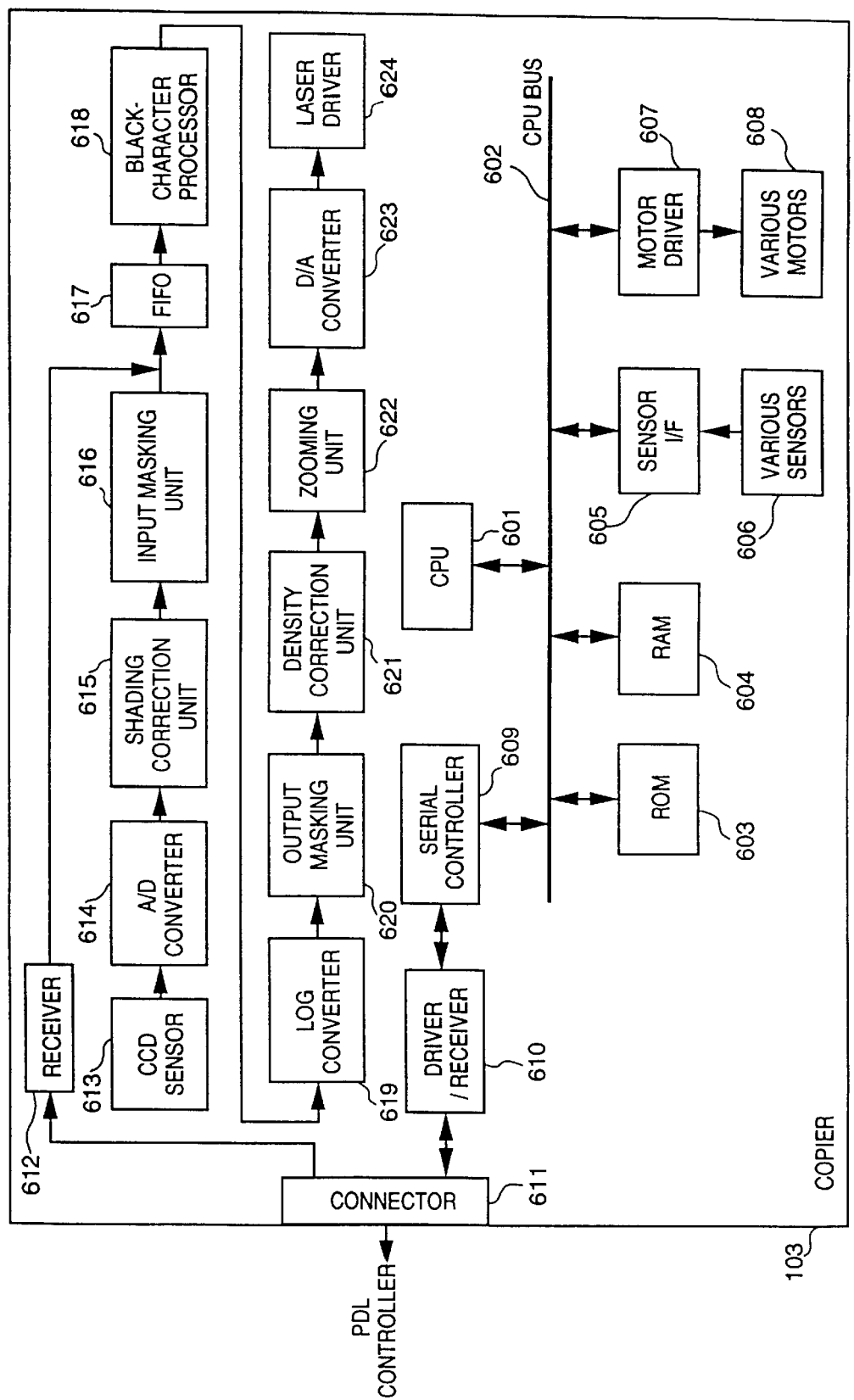
FIG. 4 is a block diagram showing the circuit arrangement of a copier illustrated in FIG. 1.

FIG. 4 is a block diagram showing the circuit arrangement of the copier 103.

As shown in FIG. 4, the copier 103 has a CPU 601 connected to each of the components, described below, via a CPU bus 602, exchanges data with these components and controls them. A processing program for start-up, a control program and various data are stored in a ROM 603 in advance. A RAM 604 is utilized by the CPU 601 to save working data and the like. Further, the CPU 601 communicates with the PDL controller 102 via a connector 611 using a controller 609 for serial communication and a driver/receiver 610.

A sensor interface (sensor I/F) 605 enters signals from various sensors 606 for sensing an original, jamming, etc. A motor driver 607 drives various motors 608 for moving a halogen lamp that illuminates the original and rotating a transfer drum and paper-feed rollers. Though there are a plurality of the sensors 606, sensor I/Fs 605, motors 608 and motor drivers 607, only one of each is shown in order to simplify the description.

A series of components from a CCD sensor 613 to a laser driver 624 constitutes an image processing section which executes copying. An image signal representing the image of the original outputted by the CCD sensor 613 is converted from an analog signal to an RGB eight bit digital signal by an A/D converter 614, a variance between pixels of the CCD sensor 613 is corrected by a shading correction unit 615 and tinge is corrected by an input masking unit 616.

The corrected image signal enters a black-character processing circuit 618 via a FIFO 617, black characters are discriminated by area processing and black characters undergo edge emphasis. The image signal that has undergone black-character processing is converted from the RGB signal to a CMY signal by a LOG converter 619, and any of color-component signals C, M, Y, K is generated by an output masking unit 620 depending upon the particular color developed at that time.

The color-component signal outputted by the output masking unit 620 is corrected by a density correcting unit 621 so as to have a density designated by the user, the corrected signal is zoomed by a zoom unit 622 to a magnification designated by the user, the resulting signal is converted to an analog signal by a D/A converter 623, and the analog signal is outputted to laser driver 624. On the basis of the entered color-component signal, the laser driver 624 applies pulse-width modulation to the laser beam that forms the latent image.

The shading correction unit 615, input masking unit 616, black-character processor 618, LOG converter 619, output masking unit 620 and zoom unit 622 may be realized by gate arrays, standard cells or embedded arrays. Though the details are not illustrated, all of these are connected to the CPU bus 602. The processing parameters and the like are set by the CPU 601.

Meanwhile, the image signal sent from the PDL controller 102 enters the FIFO 617 through a connector 611 and a receiver 612, the image clock frequency is converted and the resulting signal is sent to the blackcharacter processor 618.

Mechanical Construction of Copier

Figure 5:
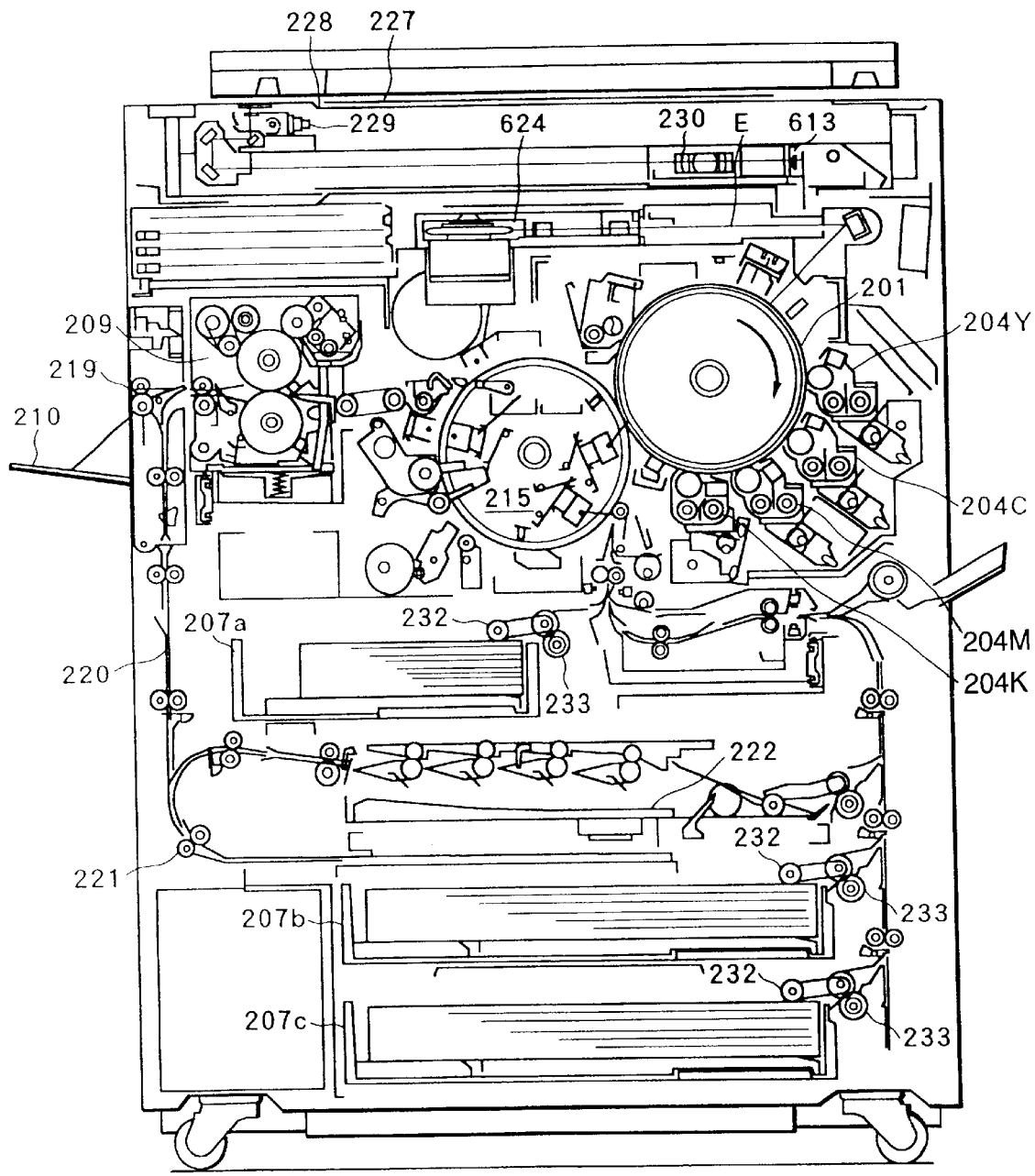
FIG. 5 is a schematic view showing the mechanical construction of the copier illustrated in FIG. 1.

FIG. 5 is a schematic view showing the mechanical construction of the copier 103.

The copier 103 has upper, intermediate and lower cassettes 207a, 207b and 207c, respectively, for feeding paper. The upper cassette 207a is special-purpose cassette for recording paper of small size, e.g., A4, B5 and letter size. The recording paper is fed and conveyed from these cassettes by paper-feed rollers 232, 233 and is wound upon a transfer drum 215.

Meanwhile, a document 227 placed upon a glass platen 228 is illuminated with light emitted by a moving halogen lamp 229, light reflected from the document forms an image on the CCD sensor 613 through the intermediary of an f-θ lens 230, and the CCD sensor 613 converts the image to an electric signal. The electric signal is sent to an A/D converter 614 as an analog image signal. This signal is then subjected to image processing by the processing circuitry described above in conjunction with FIG. 4.

An emitted laser beam E that has been PWM-modulated by the laser driver 624 is made to scan in the line direction by a polygon mirror 203a, thereby forming a latent image on a photosensitive drum 201. Depending upon the color component formed, the latent image is developed by one of developing units 204Y, 204C, 204M, 204K using toner. The developed image is then transferred to the recording paper wound upon the transfer drum 215. By repeating the latent-image formation, toner development and toner-image transfer in the order of the development colors M, C, Y, K, a full-color image is formed on the recording paper field by field. The recording paper on which the full-color image has been formed is sent to a fixing unit 209, whereby the toners are fixed. The recording paper is then discharged into a discharge tray 210 by a paper-discharge roller 219.

In case of double-sided copying, the recording paper on one side of which the toners have been fixed is turned over by a reversing g roller 221 via a paper path 220 without t being ejected from the copier. Upon being received within an internal tray 222, the recording paper is wound upon the transfer drum 215 again and an image is formed on the other side of the paper. The recording paper is then discharged from the copier.

The operation of copier 103 is of two types, namely color printing based upon MCYK development and black (monochromatic) printing based upon K development. The number of revolutions of the transfer drum 215 is four per copy in the former case and one per copy in the latter.

Further, in printing of small size copies such as A4 or letter size, performance can be improved by attaching two sheets of recording paper on the transfer drum 215 and printing on both sheets concurrently. This is referred to as a "two-sheet operation". A printing operation in which only one sheet of recording paper is attached upon the transfer drum is referred to as a "one-sheet operation".

Signals between PDL Controller and Copier

The signals exchanged between the PDL controller 102 and copier 103 will now be described. In the description that follows, (C→D) indicates the direction from the PDL controller 102 to the copier 103, (C←D) indicates the direction from the copier 103 to the PDL controller 102, and signals to which "*" has been attached represent negative logic.

R: (C→D) R image signal
G: (C→D) G image signal
B: (C→D) B image signal

Each of these signals is an eight-bit signal, by way of example.

Figure 6A:
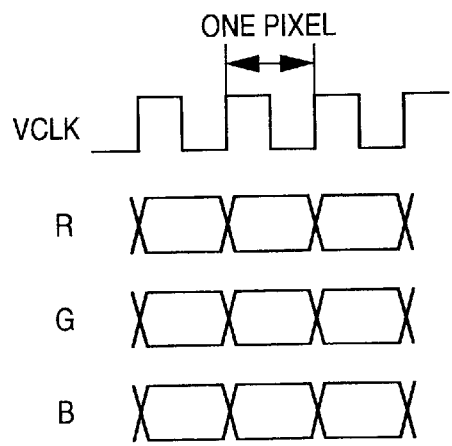
FIGS. 6A, 6B and 6C are diagrams for describing signals between the PDL controller and copier illustrated in FIG. 1.
Figure 6B:
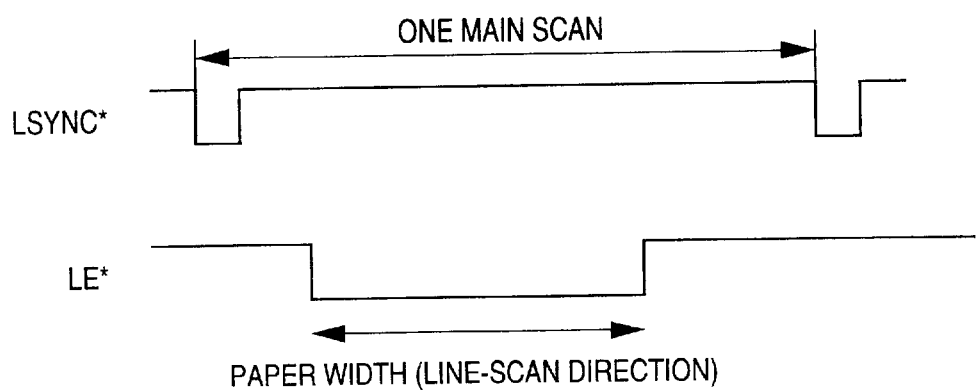
Figure 6C:
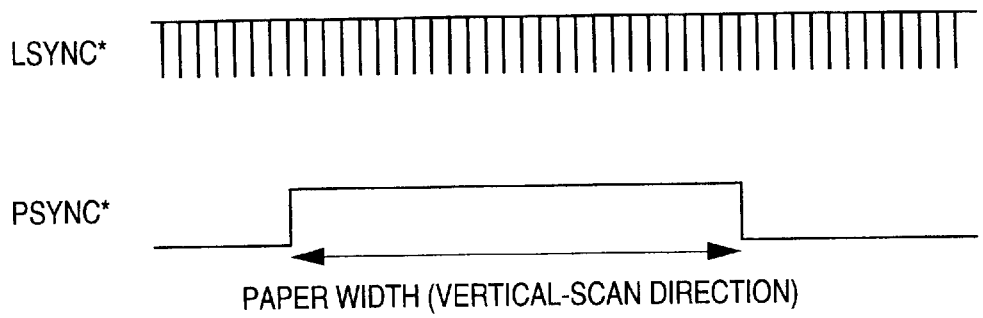

VLCK: (C→D) clock signal
LSYNC*: (C←D) line-scan sync signal
PSYNC*: (C←D) vertical-scan sync signal
LE*: (C→D) line-scan paper width signal
CMD: (C→D) command signal
STS: (C←D) status signal
SRR: (C→D) status-received ready signal
CRR: (C←D) command-received ready signal
DPRDY: (C←D) device power-ready signal
CPRDY: (C→D) control power-ready signal As shown in FIG. 6A, the signals R, G, B are transferred in sync with the signal VCLK. The signal LE* is synchronized to the signal LSYNC*, as shown in FIG. 6B, and is at the low level for a period of time equivalent to the recording paper width in the line scanning direction. The signal PSYNC* is at the high level for a period of time equivalent to the recording paper width in the vertical scanning direction. The copier 103 sends the signals LSYNC* and PSYNC* to the PDL controller 102, and the PDL controller 102 responds to these signals by outputting the signals VCLK, LE* and the image signal RGB, thereby transferring the image data to be printed.

The signals CMD, STS, SRR and CRR are signals for serial communication between the PDL controller 102 and the copier 103. The signal STS is a status signal from the copier 103 to the PDL controller 102, and the signal CMD is a command signal from the PDL controller 102 to the copier 103. If the status signal STS is capable of being received, the PDL controller 102 raises the signal SRR to the high level. If the command signal CMD is capable of being received, the copier 103 raises the signal CRR to the high level.

Further, the signals DPRDY and CPRDY are signals by which the PDL controller 102 and copier 103 ascertain the status of each other's power supply, namely whether the power supply is on or off.

Communication Protocol between PDL Controller and Copier

Communication between the PDL controller 102 and copier 103 is half duplex serial communication, e.g., 9600 baud, eight-bit data width, odd parity, two stop bits. Communication is performed in accordance with the following protocol:

(1) The power-ready signal CPRDY is at the low level at the moment the power supply of the PDL controller 102 is turned on. However, when initialization of the PDL controller 102 ends and communication with the copier 103 is enabled, the signal CPRDY attains the high level. When the power supply of the PDL controller 102 is turned off, the signal CPRDY reverts to the low level. The same holds true for the signal DPRDY in the color copier 103.

(2) The PDL controller 102 and the copier 103 monitor each other's power-ready signal (DPRDY or CPRDY) and perform the required initialization processing when the power-ready signal from the other unit changes from the low to the high level.

(3) The PDL controller 102 raises the signal SRR to the high level when the status signal STS is capable of being received and sets the signal SRR to the low level when the status signal STS is incapable of being received. Similarly, the copier 103 raises the signal CRR to the high level when the command signal CMD is capable of being received and sets the signal CRR to the low level when the command signal CMD is incapable of being received.

(4) Communication always starts with transmission of a command from the PDL controller 102 and ends with transmission of status from the copier 103. Accordingly, the status signal from the copier 103 is sometimes referred to as a "response".

(5) The lengths of command and response are variable (the minimum length is one byte). The value of the LSB of each byte indicates whether this byte is the last byte. When the LSB is "1", this indicates that there is a succeeding byte. When the LSB is "0", this means that the byte is the last byte (see FIG. 7). In other words, the PDL controller 102 or copier 103 continues reception until a byte for which the LSB of the data (response or command) from the other unit is "0".

(6) When its own power supply is on, the PDL controller 102 always sends a configuration command if the signal DPRDY from the copier 103 is at the high level or if the signal DPRDY from the copier has changed from the low to the high level. As a result, the PDL controller 102 and copier 103 are capable of exchanging configurations.

(7) The PDL controller 102 sends a sense command at least once in a fixed period of time (e.g., 100 ms). As a result, the pDL controller 102 and copier 103 are capable of exchanging each other's latest status.

(8) As mentioned above, communication starts with transmission of a command from the PDL controller 102 and ends with transmission of a response from the copier 103. Therefore, when it is desired to place the PDL controller 102 in operation, the copier 103 adds the desired command onto the end of the response to the sense command and then sends the resulting signal.

(9) In a case where the command from the PDL controller 102 is undefined or cannot be received correctly owing to a parity error or framing error, the copier 103 sends only one byte of, say, 80 H as the response data. On the other hand, since the MSB of the first byte of the response data will always be "0" when operation is normal, the PDL controller 102 is capable of determining whether the command has been received normally or not by checking the MSB of the first byte of the response data. The MSB of the first byte of the response data is referred to as an "A/N" (acknowledge/not acknowledge) bit.

Definition of Terms

The terms used in the following description will now be defined.

"Printing job" refers to a set of print requests which the PDL controller 102 issues to the copier 103. Images on one or more pages are printed, in a designated number of copies, by one printing job. It should be noted that the number of copies in one printing job is constant and that the size of the recording paper and the printing mode (one revolution, four revolutions, etc.) is fixed as well.

"Temporary stop (during printing job)" means stopping the copier 103 because PDL development cannot keep pace during one printing job or because jamming has occurred during one printing job, etc. Since printing of an output not yet completed usually is left in the printing job in such case, the PDL controller 102 sends a print-start command to the copier 103 again. In double-sided printing, the copier is temporarily stopped also when the source of paper feed is switched over from a cassette to the internal tray 222.

"Print command job" refers to a set of print requests to be printed by a single print start command. In general, one printing job comprises one or more print command jobs. If printing in accordance with a printing job is temporarily stopped, then one printing job will be equal to one print command job. In one print command job, the paper-feed stages are fixed.

"Print count" refers to the number of print sheets to be formed images formed on them respectively. In a case where a plurality of identical print outputs are obtained based upon one item of image data, the number of these copies is counted. In a double-sided printout, the count is "two" owing to the images formed on both the front and back sides.

"Total print count" is the number of prints to be printed by the printing job. After a temporary stop, the total print count is the number of prints not yet outputted in the printing job. The PDL controller 102 notifies the copier 103 of the number.

"Preparatory print count" is the number of images for which output of image data has been prepared on the controller side. A print for which image formation is in progress and a print for which image formation has been completed are not included in the preparatory print count.

For example, when one page of image data has been developed for three copies, the preparatory print count is three before printing starts. When the first copy among the three has been formed, the preparatory print count is two. When one page of image data has been developed for one copy, the preparatory print count is one before printing starts. When this has been formed, the preparatory print count becomes zero. When, during formation of this image, the next page of image data has been developed for one copy, the preparatory print count becomes one. Furthermore, when two pages of image data have been developed for three copies each, the preparatory print count is six before printing starts. If jamming occurs and only one page of the first copy is printed, the preparatory print count becomes five. When one page of image data has been developed for four copies, the preparatory print count is four before printing starts. If the first and second copies thereof are in the process of being formed by the two-sheet operation, the preparatory print count becomes two.

"Minimum preparatory print count" is the minimum necessary preparatory print count, at the time of a paper feed/discharge judgment, for the purpose of operating the copier 103 continuously. The minimum preparatory print count is a value decided in dependence upon the arrangement on the printer side. This value differs depending upon the paper-feed stage, the size of the recording paper and the printing mode, by way of example. (This holds true not only for the paper feed/discharge judgment regarding the first sheet but also for the paper feed/discharge judgment regarding sheets from the second onward.) In a case where there is no advance feed of paper, the minimum preparatory print count is one. The copier 103 notifies the PDL controller 102 of this number.

"Desired minimum preparatory print count" Ph is the lower limit of minimum preparatory print count Pmin for the purpose of making continuous printing continuously possible based upon the buffer count (described later) and number of copies. This is a desired value of which the copier 103 is notified by the PDL controller 102.

"Desired printing period" Th is the lower limit of the printing period Tp of copier 103, which is based upon the average raster-image development speed of the PDL controller 102, for the purpose of so arranging it that continuous printing will not be suspended more than necessary. [There are instances below where development of a raster image will be referred to as "RIP (raster image processing) development".] This is a desired value of which the copier 103 is notified by the PDL controller 102. This desired printing period Th differs depending upon whether the image is a color image or monochromatic image. The printing period Tp is the image formation period (in seconds) when the copier 103 performs continuous printing. The printing period Tp is adjusted by adjusting the interval at which recording paper is supplied in the copier 103. Basically, the desired printing period Th differs depending upon color or monochromatic printing, number of print copies and the one-sheet/two-sheet operation. If the value of the desired printing period Th is zero, this means that the copier 103 is operating at peak speed.

"Buffer count" refers to the number of pictures capable of being held in the frame memory of the PDL controller 102 at one time. The buffer count is decided by the size of the recording paper of the printing job, the number of bits (bit depth) representing one pixel, and the frame memory size of the PDL controller 102. There are cases where the upper limit of the buffer count is limited by the design of the PDL controller 102. For example, in a case where the PDL controller 102 has a 400-dpi, size A3 memory of 24 bits per pixel, the buffer count becomes two when it is attempted to develop an image of size A4.

"Prepared print count" Pr is the total of the preparatory print count Pr, print count during image formation and print count at end of image output, namely the total number of prints for which development has been completed. Since the number of copies is constant in the printing job, the prepared print count Pr is equal to the product of the number of pages for which development is finished and the number of copies. This number does not include the number of prints for which image output has been completed in the print command jobs up to the immediately preceding print command job after a temporary stop.

"Fed-sheet count" Pf represents the number of sheets of recording paper already fed within the copier. In case of double-sided prints, sheets of recording paper supplied from the internal tray 222 also are counted. The count is zero at the start of printing. When printing is restarted is after a temporary halt, the count starts from zero again. In the case where the fed-sheet count Pf becomes zero at restart of printing after a temporary halt, the prepared print count Pr also is made zero.

"Discharged-sheet count" Po represents the number of prints for which discharge from the copier has been completed upon the end of image formation. This count includes the count of sheets discharged into the internal tray 222 for the purpose of double-sided printing. It should be noted that the discharged-sheet count Po is used in a stop command.

Communication Commands and Responses between PDL Controller and Copier

Communication commands and responses between the PDL controller and copier will be described next. Let C0, C1, . . . represent the byte strings of commands and R0, R1, . . . the byte strings of responses.

Figure 8:
FIG. 8 is a diagram showing an example of configuration commands and the responses thereto.

FIG. 8 is a diagram showing an example of configuration commands and the responses thereto. A command C0 (03H) signifies a configuration command. Controller type included in a command C1 contains a code representing the model of the PDL controller 102. For example, this is made 01H. Controller ROM version contained in a command C2 represents the version of the program that has been stored in the ROM 505 of PDL controller 102. For example, this is made 01H.

Device type contained in a response R0 includes a code representing the model of the copier 103. In the case of the copier of this embodiment illustrated in FIGS. 4 and 9, this is made 01H, by way of example. CS contained in response R1 includes a code representing the number of slots (the maximum of which is seven) for the cassettes provided in the copier 103. For example, since the copier of this embodiment is equipped with three slots, as shown in FIG. 5, this becomes 03H. An MF bit contained in the response R1 is set to "1" if the copier 103 has a manual paper-feed function; otherwise, the MF bit is set to "0". A DB bit contained in the response R1 is set to "1" if the copier 103 has a double-sided printing function; otherwise, the DB bit is set to "0".

Figure 9:
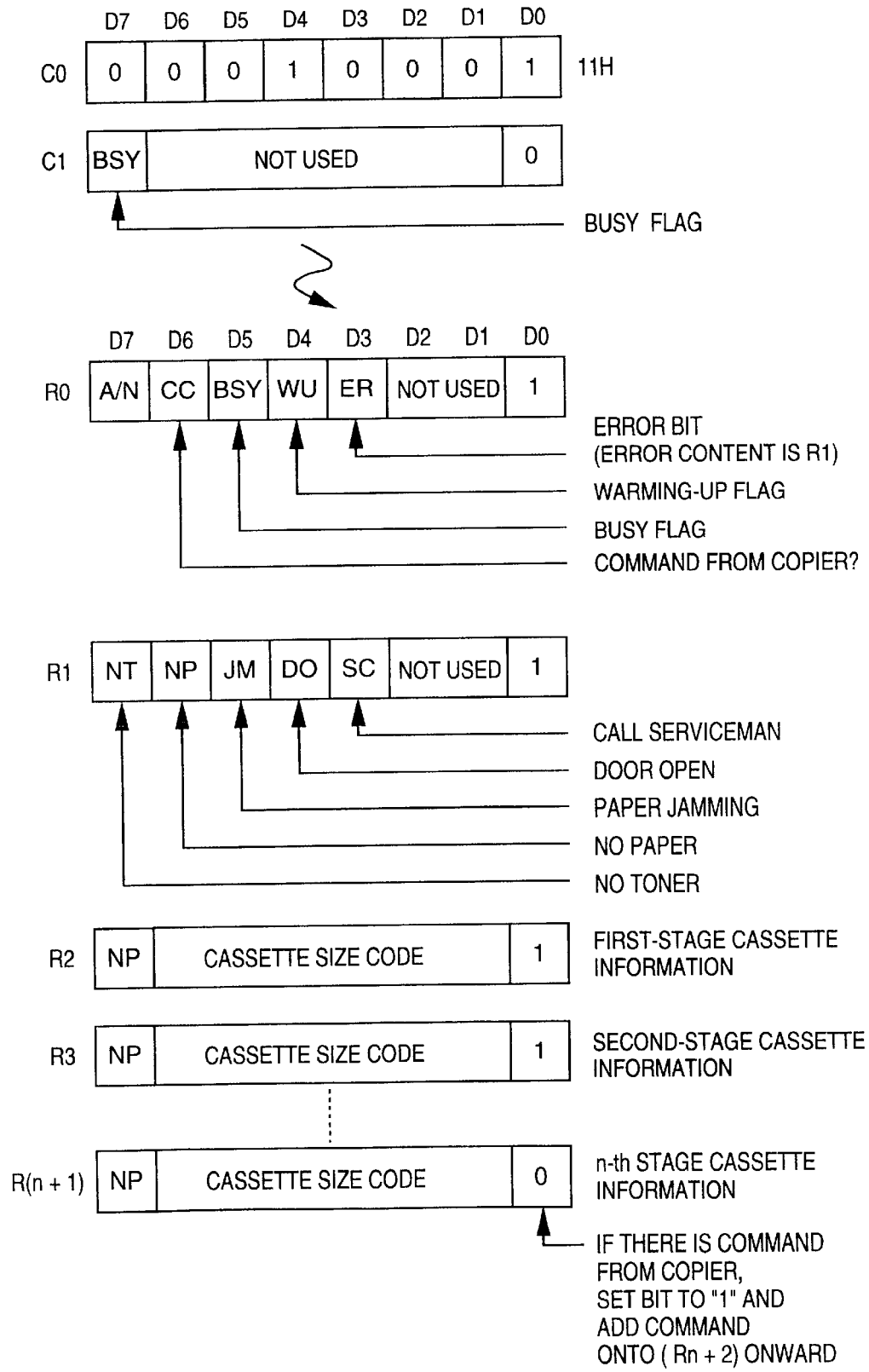
FIG. 9 is a diagram showing an example of sense commands and the responses thereto.

FIG. 9 is a diagram showing an example of sense commands and the responses thereto. Command C0 (11H) signifies a sense command. A BSY bit contained in command C1 is a busy flag of PDL controller 102. This bit is set to "1" when the PDL controller 102 is developing PDL and to "0" when the PDL controller 102 is in the idle state.

A CC bit contained in response R0 is set to "1" if there is a command from the copier 103 at the end of the response and to "0" if there is no command. A BSY bit contained in response R0 is a busy flag of the copier 103. This bit is set to "1" when the copier 103 is performing copying or printing and to "0" when the copier 103 is in the idle state. A WU bit contained in response R0 is set to "1" when the copier 103 is warming up and to "0" at all other times. An ER bit in response R0 is set to "1" when the copier 103 has developed an error of some kind and to "0" at all other times. It should be noted that in a case where the ER bit is "1", the type of error can be ascertained from each bit of response R1.

In response R1, an NT bit is a flag representing "no toner", an NP bit is a flag representing "no paper", a JM bit is a flag representing "jamming", a Do bit is a flag indicating the fact that a maintenance door on the copier 103 is open, and an SC bit is a flag representing "serviceman call".

Responses from R1 to R(n+1) constitute information representing each of the cassettes, where n is the total number of cassette stages and is equal to the CS value contained in response R1 to the configuration command. The NP bit contained in these responses is a flag indicating that there is no recording paper in the cassette of the particular stage. Cassette size code includes a predetermined code indicative of cassette size. For example, the predetermined codes included are as follows:

code: recording paper size

01H: A3

02H: A4

03H: A4-R

04H: B4

05H: B5

06H: B5-R

07H: 11×17

08H: Letter

09H: R (Letter-R)

0AH: Legal

0BH: Statement

3FH: No cassette

Figure 10:
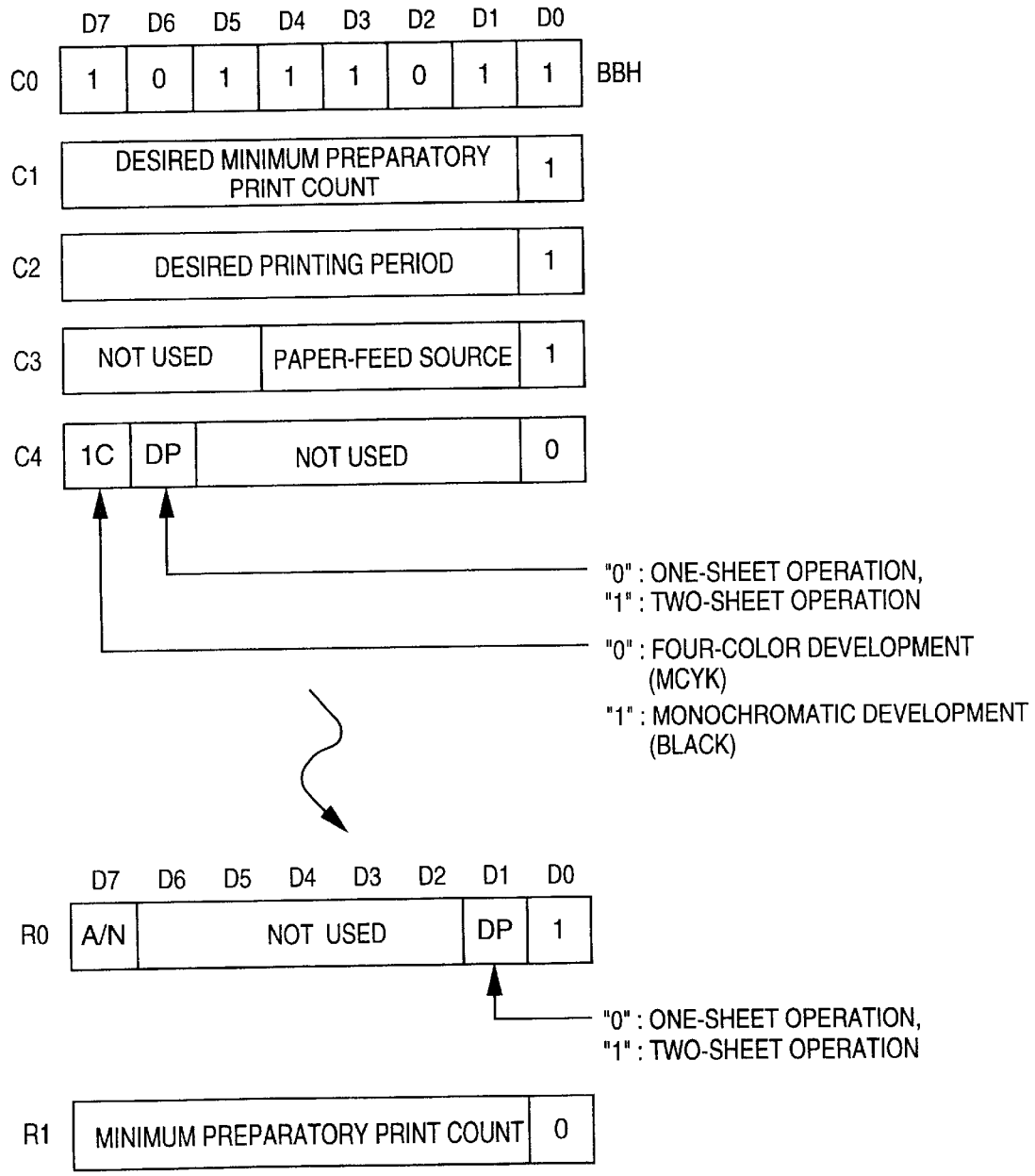
FIG. 10 is a diagram showing an example of paper-feed control commands and the responses thereto.

FIG. 10 is a diagram showing an example of paper-feed control commands and the responses thereto. These commands, which are sent from the PDL controller 102, a re us ed to instruct the copier 103 of printing conditions and to make an inquiry with regard to the minimum preparatory print count for which continuous operation is possible.

In FIG. 10, command C0 (BBH) signifies a paper-feed control command. Commands C1, C2 and C3 represent the desired minimum preparatory print count, the desired printing period and source of paper feed, respectively. A DP bit contained in command C4 is set to "0" at the time of one-sheet operation and to "1" at the time of two-sheet operation. A 1C bit contained in command C4 is set to "0" at the time of four-color development and to "1" at the time of black (monochromatic) development.

A DP bit contained in response R0 is set to "0" at the time of one-sheet operation and to "1" at the time of two-sheet operation. Response R1 represents the minimum preparatory print count. The response can include the printing period, etc., though this is not shown.

Figure 11:
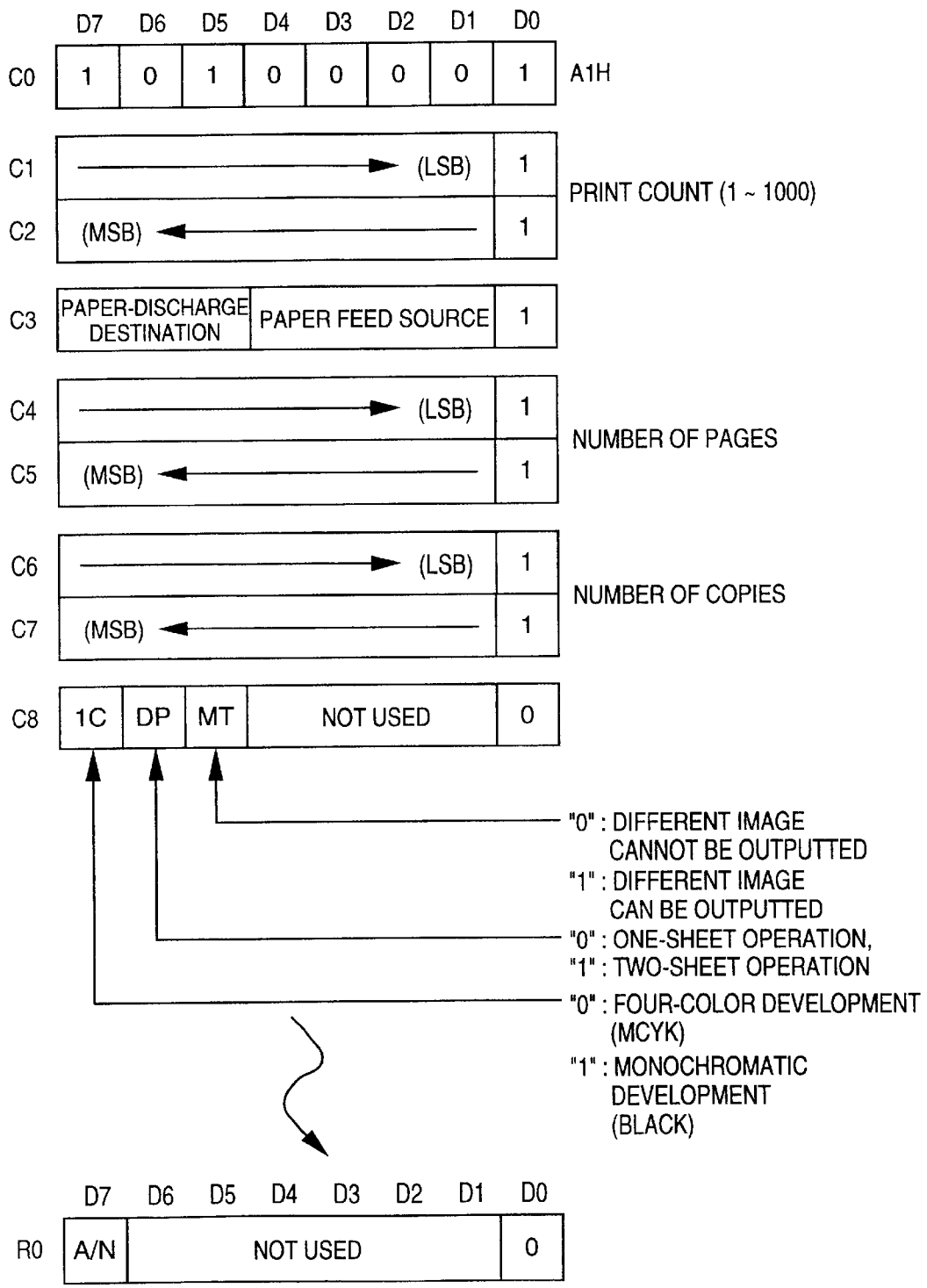
FIG. 11 is a diagram showing an example of print start commands and a response thereto.

FIG. 11 is a diagram showing an example of print start commands and a response thereto. A command C0 (A1H) signifies a print start command. Commands C1 and C2 represent print count (e.g., 1~1000), where C2 represents the MSB side of the print count and C1 the LSB side of the print count. Command C3 includes codes representing source of paper feed and destination of paper discharge. Commands C4 and C5 represent number of pages, where C5 represents the MSB side of the number of pages and C4 the LSB side of the number of pages. Commands C6 and C7 represent number of copies, where C7 represents the MSB side of the number of copies and C6 the LSB side of the number of copies. A 1C bit contained in command C8 is set to "0" at the time of four-color development and to "1" at the time of black (monochromatic) development. A DP bit contained in command C8 is set to "0" at the time of one-sheet operation and to "1" at the time of two-sheet operation. In two-sheet operation, a MT bit contained in command C8 is set to "1" when a different image can be outputted every sheet and to "0" when a different image cannot be outputted every sheet.

In response to the print start command, the copier 103 ordinarily sends back only response R0, which includes only an A/N bit.

Figure 12:
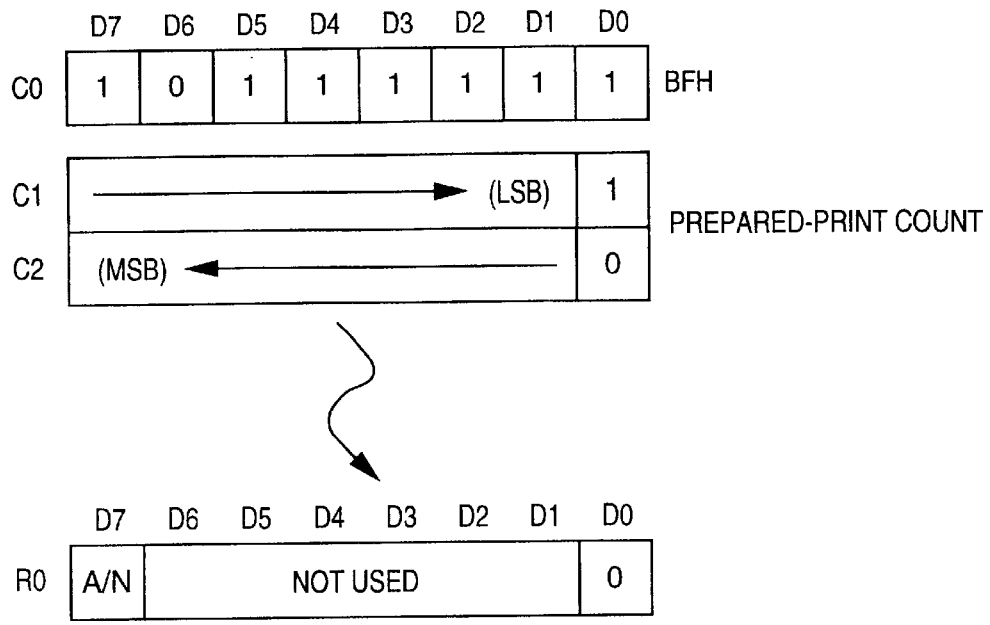
FIG. 12 is a diagram showing an example of continue commands and a response thereto.

FIG. 12 is a diagram showing an example of continue commands and a response thereto. These commands notify the copier 103 of the prepared print count at the moment RIP development of a new page is finished prior to the print start command and during printing.

In FIG. 12, command C0 (BFH) signifies a continue command. Commands C1 and C2 represent the prepared print count, where C2 represents the MSB side of the prepared print count and C1 the LSB side of the prepared print count. In response to the continue command, the copier 103 ordinarily sends back only response R0, which includes only an A/N bit.

Figure 13:
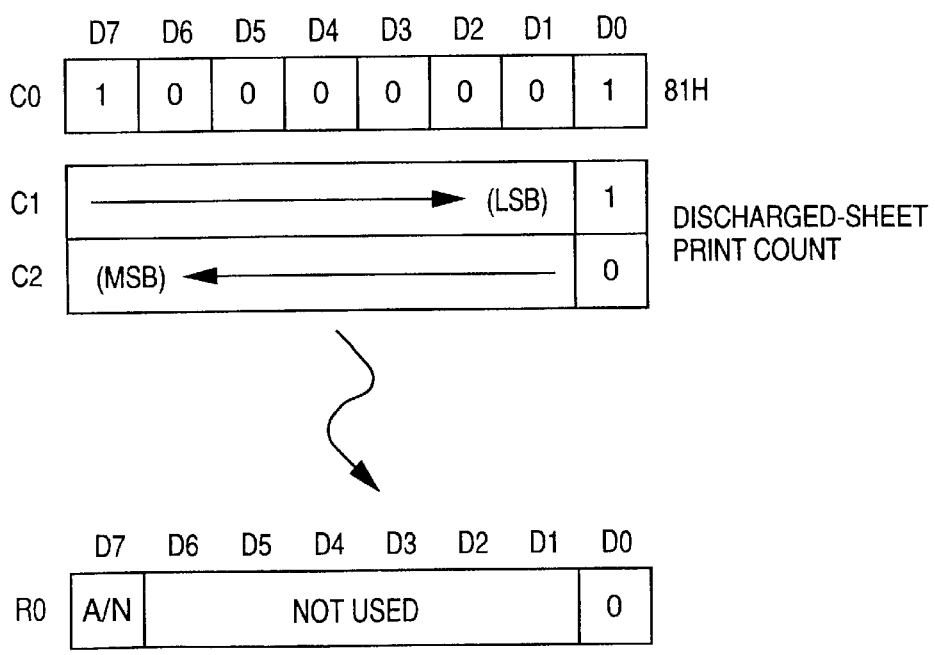
FIG. 13 is a diagram showing an example of stop commands, issued by a copier, and a response thereto.

FIG. 13 is a diagram showing an example of stop commands issued by the copier 103 and a response thereto. Command C0 (81H) signifies a stop command. Commands C1 and C2 represent the discharged sheet count, where C2 represents the MSB side of the discharged sheet count and C1 the LSB side of the discharged sheet count. In response to the stop command, the PDL controller 102 ordinarily sends back only response R0, which includes only an A/N bit.

Printing Sequence

Figure 14:
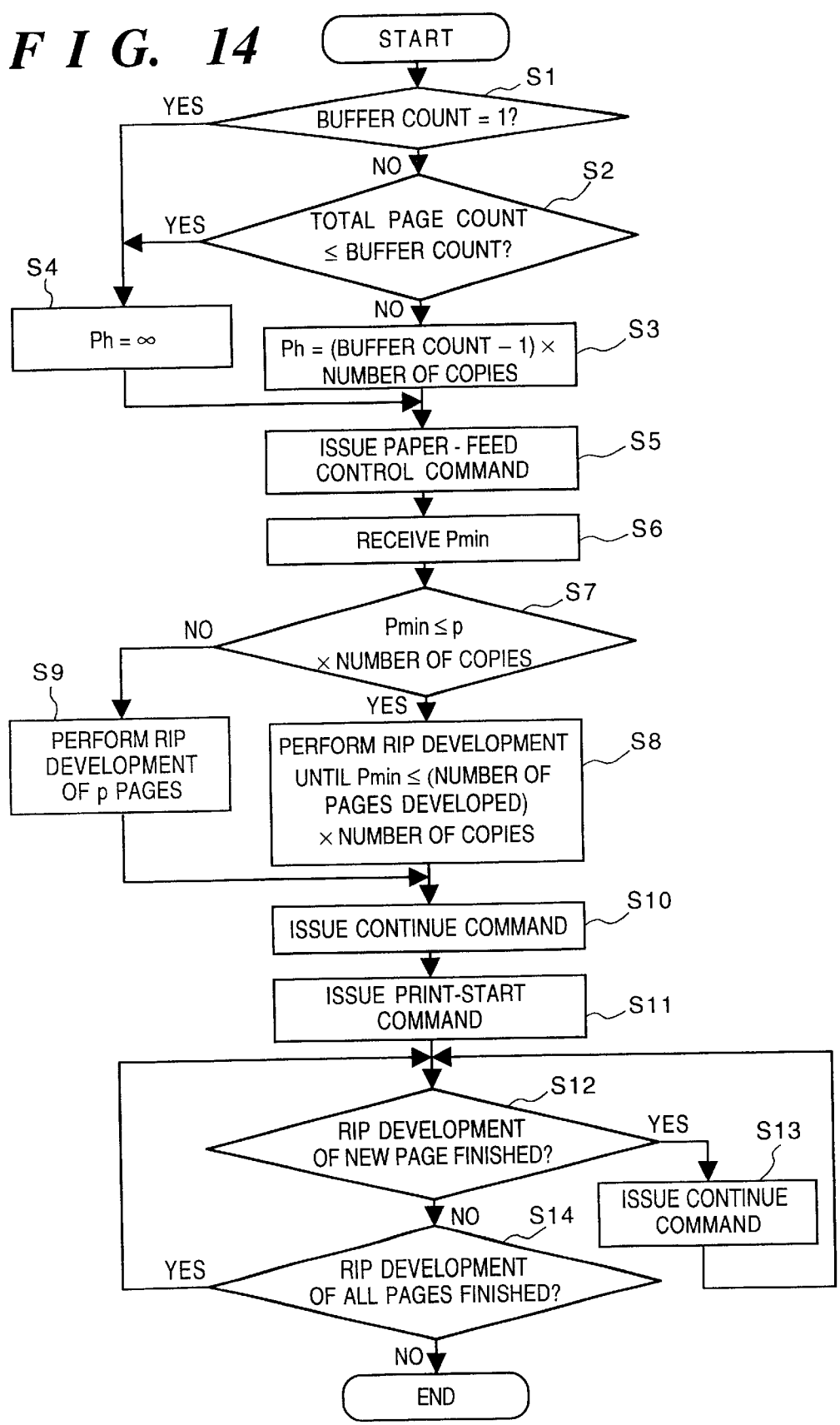
FIG. 14 is a flowchart illustrating an example of a printing sequence.

FIG. 14 is a flowchart showing an example of a printing sequence. This sequence is executed by the CPU 501 of the PDL controller 102 when printing is executed.

When printing is started, the PDL controller 102 first discriminates the buffer count at step S1 and then discriminates the relationship between the buffer count and the total number of pages to be printed. If the relations (buffer count)>1 and (total number of pages)>(buffer count) hold ("NO" at steps S1 and S2), then (buffer count−1)×(number of copies) is set for "desired minimum preparatory print count" Ph at step S3. Otherwise, infinity (actually the maximum value) is set for Ph at step S4. When the total number of pages to be printed is unknown, it is assumed that the total number of pages is equal to infinity.

Next, the PDL controller 102 executes the paper-feed control command at step S5 and provides the copier 103 with such conditions as the "desired minimum preparatory print count" Ph, the "desired printing period" and the paper-feed stage. The PDL controller 102 receives the "minimum preparatory print count" Pmin from the copier 103 at step S6.

Next, the PDL controller 102 performs RIP development under the following conditions: Specifically, at step S7, the PDL controller 102 compares Pmin and p×(number of copies) (where p represents the number of pages). If Pmin≦p×(number of copies) holds, the PDL controller 102 performs RIP development until the relation Pmin≦(number of pages developed)×(number of copies) is established at step S8. If Pmin>p×(number of copies) holds, the PDL controller 102 performs RIP development with regard to p-number of pages at step S9. Here the parameter p is the smaller of the buffer count and number of pages. When the number of pages is unknown, (number of pages)=1 is established.

More specifically, the case where p×(number of copies) is larger than Pmin is a case where the number of images to be printed is greater than [(number of sheets for which advance paper-feed is possible)+1]. Therefore, images that at least exceed the number of sheets for which advance paper-feed is possible are developed. Further, in a case where p×(number of copies) is not greater than Pmin, p-number of pages are developed.

Next, at step S10, the PDL controller 102 issues the continue command shown in FIG. 12, thereby informing the copier 103 of the "prepared print count", and issues the print start command at step S11 to cause the copier 103 to start printing. Upon receiving the continue command, the copier 103 updates the "prepared print count". If the continue command has not been received before the print start command, the prepared print count Pr is made a print count designated by C1, C2 of the print start command.

The PDL controller 102 determines whether RIP development of a new page has ended at step S12. If development of a new page has ended, the PDL controller 102 issues a continue command at step S13 and notifies the copier 103 of the prepared print count Pr prevailing at this time (namely the count increased by the number of prints capable of being newly developed). The program then returns to step S12. This may be done before the first page is formed or at any other time so long as it is after the copier 103 has started printing. Further, in a case where development of a new page has not ended, it is determined at step S14 whether the RIP development of all pages is finished. If development is not finished, the program proceeds to step S12. If development is finished, then printing processing is terminated.

Figure 15A:
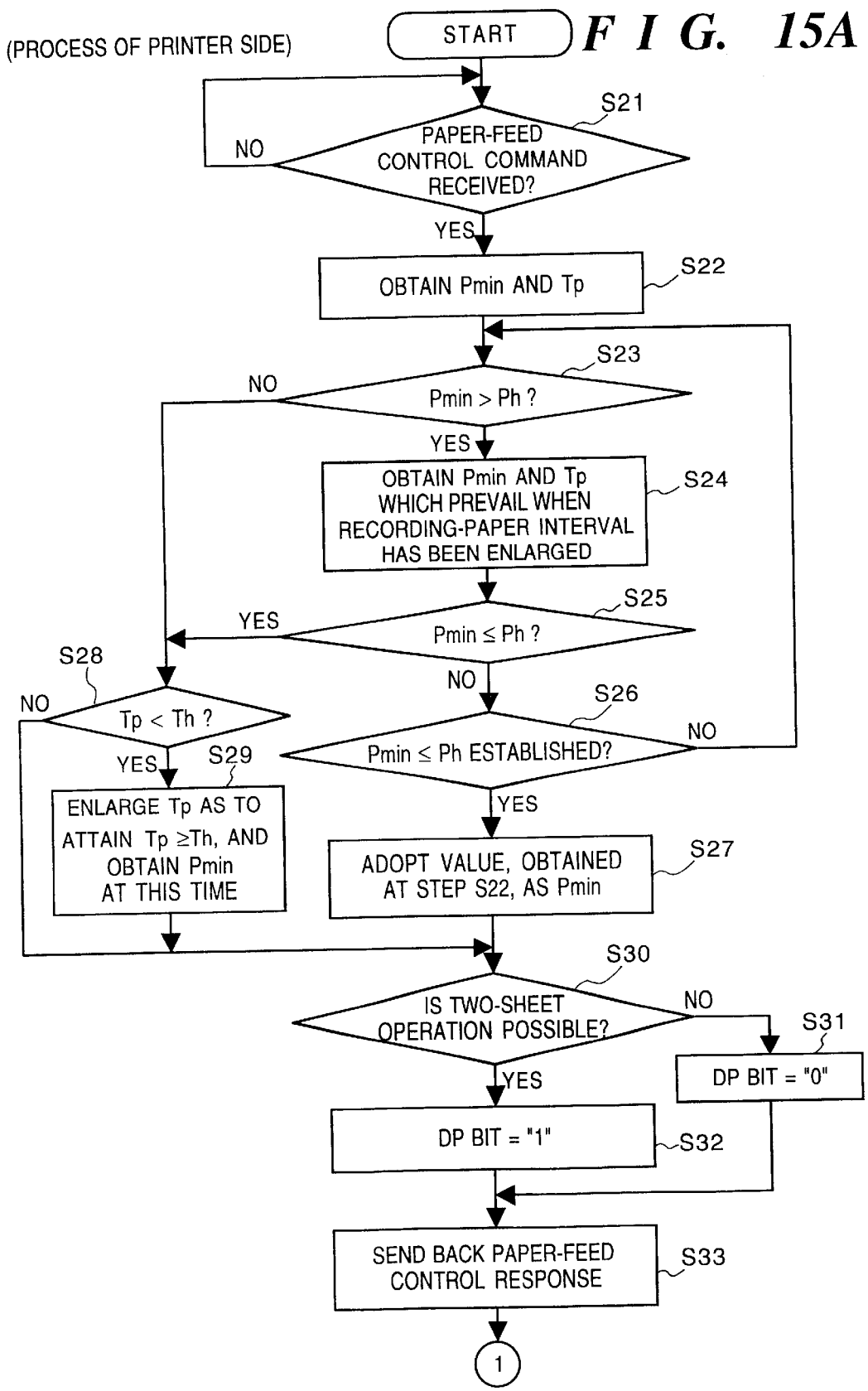

FIGS. 15A, 15B are flowcharts illustrating an example of a printing sequence. This sequence is executed by the CPU 601 of the copier 103 when printing is executed.

The copier 103 waits for reception of a paper-feed control command at step S21. When the command has been received, the copier 103 uses a table or the like, which has been stored in the ROM 603, at step S22 to obtain the minimum preparatory print count Ph Pmin and printing period Tp from the print conditions designated by this command. The copier compares the desired minimum preparatory print count Ph and Pmin at step S23.

If the relation Pmim>Ph holds, the copier 103 obtains Pmin and Tp, which prevail when the recording paper interval is enlarged, at step S24. The copier determines whether Pmin≦Ph holds at step S25. If Pmin≦Ph does not hold, the copier 103 determines at step S26 whether it is possible to enlarge the recording paper interval and realize Pmin≦Ph. If this is possible, the program returns to step S24. If it is not possible, then the value initially obtained (step S22) is made Pmin at step S27. In other words, the recording paper interval is minimized, in which case it becomes impossible to continue the continuous printing operation. Therefore, this is a case in which printing is stopped between pages ever Pmin, i.e., every desired minimum preparatory print count.

In general, the number of sheets in advanced paper feed is decreased when the recording paper interval is enlarged (or when the two-sheet operation is made a one-sheet operation). Therefore, this is accompanied by a decrease in the minimum preparatory print count Pmin and, at the same time, in a longer printing period Tp. The relationship between the recording paper interval (the two-sheet operation includes the one-sheet operation as well) and the minimum preparatory print number Pmin and printing period Tp is stored in the above-mentioned table or the like.

If Pmin≦Ph holds at step S23 (this a case where continuous printing is capable of being continued satisfactorily) or if Pmin≦Ph holds at step S25 (this is case where the number of sheets for advance feed is reduced in such a manner that continuous printing can be continued), then the copier 103 compares Tp and the desired printing period Th at step S28. If Tp<Th holds, then the copier extends Tp until the relation Tp≧Th is established (or merely extends Tp) and obtains the Pmin prevailed at such time at step S29.

Next, at step S30, based upon the designated printing conditions and the results described above, the copier 103 determines whether the two-sheet operation is capable of being performed. If two-sheet operation is possible, the copier 103 sets the DP bit of the paper-feed control response to "1" at step S32. If two-sheet operation is not possible, the copier sets the DB bit to "0" at step S31, after which the copier sends back the paper-feed control response at step S33. Of course, the minimum preparatory print count Pmin obtained from the foregoing results is set in R1 of the same response.

Next, the copier 103 waits for reception of the print start command at step S34. Upon receiving the command, the copier 103 decides paper-feed/paper-discharge. More specifically, the copier 103 compares the prepared-print count Pr, of which it has been notified by the received continue command, and the fed-sheet count Pf. If Pr>Pf holds, the copier 103 supplies the recording paper S36 and increments Pf at step. As a result, recording paper is no longer supplied for data that has not yet been prepared, and Pr does not increase when there are no longer any images to be developed. Accordingly, paper feed ends when Pf becomes equal to Pr.

In printing of an odd number of copies in the two-sheet operation, the printing of the final copy will be only the A sides of the two sheets. Accordingly, if the MT bit of the print start command C8 is "0", the copier 103 sends the PDL controller 102 a dummy signal PSYNC* corresponding to the B sides so that no paper is fed. If the MT bit is "1", the PDL controller 102 outputs the image of the next page with regard to the B sides. As a result, the situation on the side of the copier 103 need not be taken into account.

Next, the copier 103 starts the printing operation. Specifically, at step S37, the copier 103 determines whether printing is to be stopped temporarily. If the answer is "YES", then the copier 103 issues the stop command at step S38 and the program returns to step S34, at which the copier 103 again waits for issuance of the print start command from the PDL controller 102. In a case where printing is to be continued ("NO" at step S37), the copier 103 determines at step S39 whether recording paper has been discharged. If recording paper has not been discharged, then the program returns to step S37. If recording paper has been discharged, then the copier 103 increments the discharged-sheet count Po at step S40 and determines whether printing has ended at step S41. If printing has not ended, the program returns to step S35. A method of determining whether printing is temporarily stopped or not and the details of operation at the time of temporary stop will be described later.

When printing ends, the copier 103 issues a stop command at step S42, irrespective of whether printing ends normally or abnormally, and notifies the PDL controller 102 of the discharged-sheet count Po. Next, the copier 103 clears the prepared-print count Pr, the fed-sheet count Pf and the discharged-sheet count Po to zero and ends printing processing. It should be noted that if the discharged-sheet count Po is different from the value expected, then the PDL controller 102 makes the difference Pr—Po, between the prepared-print count Pr and the discharged-sheet count Po, equal to the prepared-print count Pr in the next printing operation and performs a recovery operation.

Example of Continuous Printing

FIGS. 16A, 16B are diagrams for describing an example of continuous printing according to this embodiment. This is an example of a job in which three copies of each of six pages of images (for a total of 18 sheets) are printed.

First, a paper-feed control command, a continue command and the responses thereto are exchanged, though this is not shown. It will be assumed here that printing is started after preparations for three copies of the first page have been completed. Accordingly, "3" is set for the prepared-print count Pr of the continue command sent prior to the print start command.

When the print start command is issued by the PDL controller 102, the copier 103 starts printing the first copy of the first page (page 1, copy 1). If it is assumed that PDL development of three copies of the second page ends during the formation of the first image indicated at #1 in FIG. 16A, the PDL controller 102 will issue the continue command and notify the copier 103 of prepared-print count Pr=6 (two pages×three copies). Upon receiving the continue command, the copier 103 updates the variable holding the prepared-print count Pr.

The copier 103 has a stop check point for judging whether a continuous printing operation is to be continued or halted during each image formation cycle. In the example illustrated, there is a stop check point between the development of cyan (C) and yellow (Y), and the copier 103 determines whether a temporary stop is to be applied after the print which follows the print currently being developed. In FIG. 16A, the copier refers to the prepared-print count Pr at the check point during the printing of the 11th sheet (page 4, copy 2) to determine whether the image of the 13th sheet (page 5, copy 1) has been prepared. Since the prepared-print count Pr is "15" in FIG. 16A, it is judged that continuation of continuous printing is possible and, hence, continuous printing is continued.

FIG. 16B is an example in which a temporary stop is applied. More specifically, the copier refers to the prepared-print count Pr at the check point during the printing of the 11th sheet (page 4, copy 2) to determine whether the image of the 13th sheet (page 5, copy 1) has been prepared. Since the prepared-print count Pr is "12" in FIG. 16B, it is judged that continuation of continuous printing is not possible and, hence, paper feed of the 13th sheet (page 5, copy 1) is halted at a temporary stop is applied.

When a temporary stop is applied, the copier 103 adds a stop command onto the response to the sense command, sends "12" as the prepared-print count Pr, discharges sheets normally up to the 12th sheet (page 4, copy 3) and then notifies the PDL controller 102 of the fact that the engine has been halted.

Numerical Value Display on Control Panel

If the total number of sheets of a printing job is known in advance, the number of sheets that have been printed is down-counted from this value and the user can be provided with a criterion as to how many sheets it will be until the printing job ends. If the total number of sheets of a printing job is not known in advance, then the number of sheets that have been printed is up-counted from zero. The processing in the copier 103 and the processing in the PDL controller 102 for this purpose will now be described.

Processing by Copier

The copier 103 changes the method of displaying the numerical values on the control panel in dependence upon the print count contained in the print start command. First, when the print count is 1000, for example, the cumulative value of images formed in the print command job is displayed on the control panel. As a result, a display counted up in units of the print command job is presented. If the print count is less than 1000, for example, a value obtained by subtracting the cumulative value of images formed in the print command from the print count is displayed on the control panel. As a result, a display counted down from the total print count in units of the print command job is presented. In the description given below, the print counts at which the display method is updated are 1000 and less than 1000. However, this does not impose a limitation upon the invention. It goes without saying that the number can be any number within a range designated by the print start command.

Processing by PDL Controller

When the print start command is sent, the PDL controller 102 sets the print count in the print start command on the basis of whether the total print count (or total number of pages) is known. When the total print number (or number of pages) is known, the PDL controller 102 sends the copier 103 the total print number [or (total number of pages)× (number of copies), the maximum value of which is 999] as the print count. In a case where the total print number [or (total number of pages)×(number of copies)] exceeds 999, the PDL controller 102 designates 1000. When the total print count (or number of pages) is unknown, the PDL controller 102 designates 1000 as the print count.

In a case where printing does not use a continue command, the PDL controller 102 designates the print count (the maximum value of which is 999) that is actually to be printed. The copier 103 causes the control panel to display a value obtained by subtracting the cumulative value of images formed in the print command job from print count. As a result, a display counted down from the total print count in units of the print command job is presented and the user can be provided with a criterion as to how many sheets it will be until the printing job ends. In a case where the print job exceeds the maximum value of 999, the PDL controller 102 divides the print job into a plurality of print jobs.

In accordance with this embodiment, as described above, temporary stopping of printing in a continuous printing operation is judged on the side of the copier. Therefore, even in a case where a copier having a plurality of cassettes or a copier which performs advanced feed of paper is made to perform a printing job, the PDL controller need only execute simple control. Moreover, the total printing time can be shortened.

Further, the number Pr of items of developed image data and the number Pf of supplied sheets of recording paper are compared and new recording paper is supplied if Pr>Pf holds. This means that the copier will not continue to discharge blank sheets of paper even if the PDL controller fails to send the copier an instruction for halting the printer engine.

Further, the PDL controller issues the desired minimum preparatory print count Ph based upon buffer size, recording paper size, number of pages and number of copies, and the copier responds by adjusting the recording paper interval to send back a minimum preparatory print count Pmin that is close to Ph as possible. Since the print job is executed based upon Pmin, continuous printing can be continued for as long as possible.

An image forming apparatus according to a second embodiment of the present invention will now be described. In the second embodiment, components similar to those of the first embodiment are designated by like reference characters and need not be described again in detail.

A printing system comprising a PDL controller and a copier having a retention memory will be described as the second embodiment. A retention memory is a memory which stores one or more pages of image data obtained by scanning. In a case where a plurality of copies are made of the same original in a copier having a retention memory, printing is executed using the image data stored in the retention memory. This means that copies from the second onward do not require scanning of the original, thus making high-speed continuous copying possible.

Copier

Figure 17:
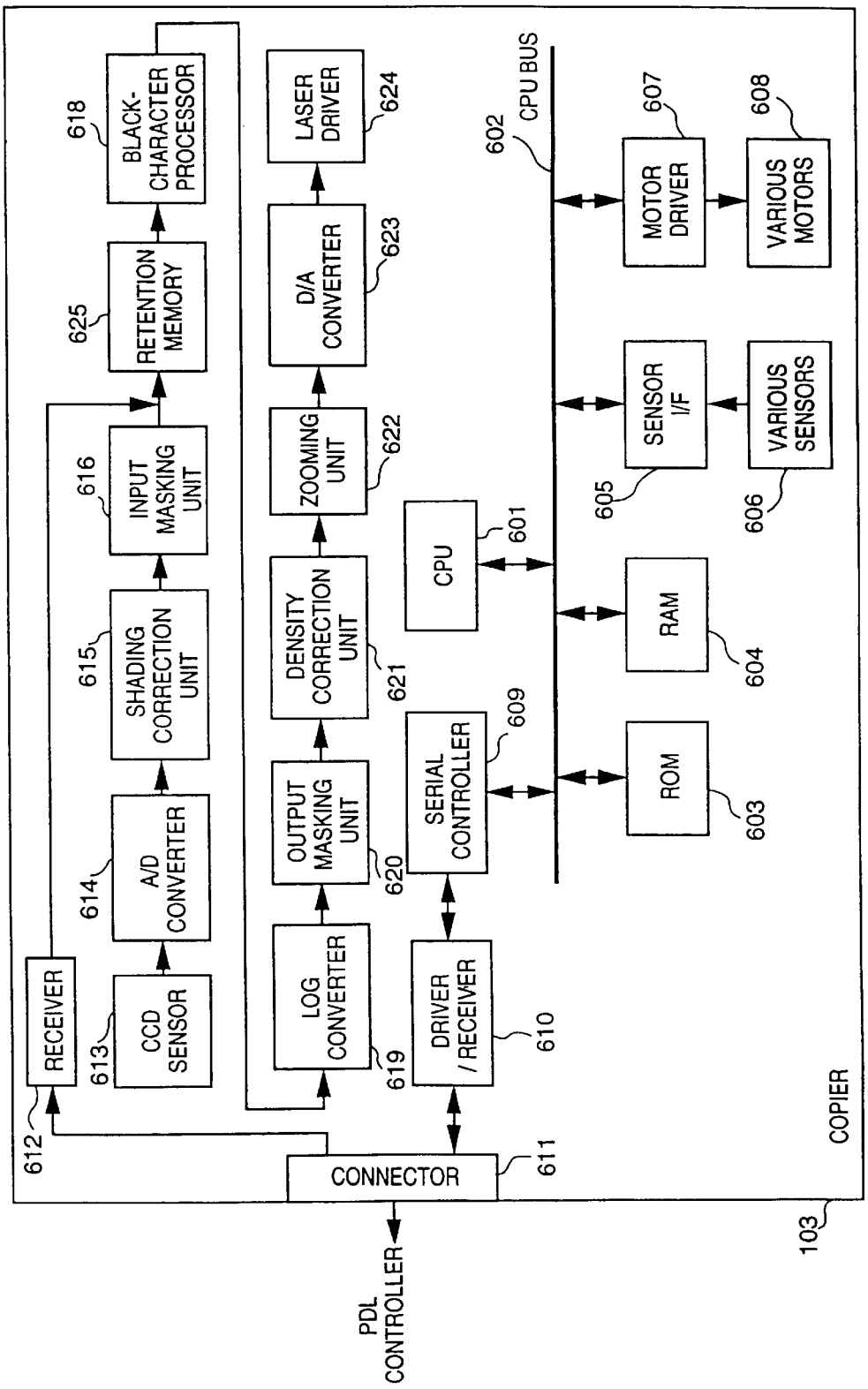
FIG. 17 is a block diagram illustrating an example of a circuit arrangement of a copier according to a second embodiment of the present invention.

FIG. 17 is a block diagram illustrating an example of the circuit arrangement of the copier 103 according to the second embodiment. This copier differs from that of the first embodiment shown in FIG. 4 in that the FIFO 617 is replaced by a retention memory 625. The retention memory 625 is constituted by a RAM having enough storage capacity to store one page of color image data of size A3, by way of example. Ordinarily, in the operation for making the first copy, the output of the input asking unit 616 is written in the retention memory 625, the signal is read out of the retention memory 625 and fed into the black-character processing circuit 618, after which printing is performed through a procedure similar to that of the first embodiment. From the second copy onward, the image that has been read out of the retention memory 625 is printed. Image data that have been sent from the PDL controller 102 are also written in the retention memory 625, after which the printing procedure is executed in the same manner as described in connection with the first embodiment.

Communication Commands and Responses between PDL Controller and Copier

Figure 18:
FIG. 18 is a diagram showing an example of a configuration command and the response thereto according to the second embodiment.

Basically, these are the same as those of the first embodiment. In this case, however, a flag indicating that the copier 103 has the retention memory is added to the responses to the configuration commands. FIG. 18 is a diagram illustrating examples of configuration commands and the responses thereto. An RM flag allocated to a sixth bit of the response R1 is set to "1" if the copier 103 has the retention memory and to "0" if the copier 103 does not possess the retention memory.

Printing Sequence

Figure 19:
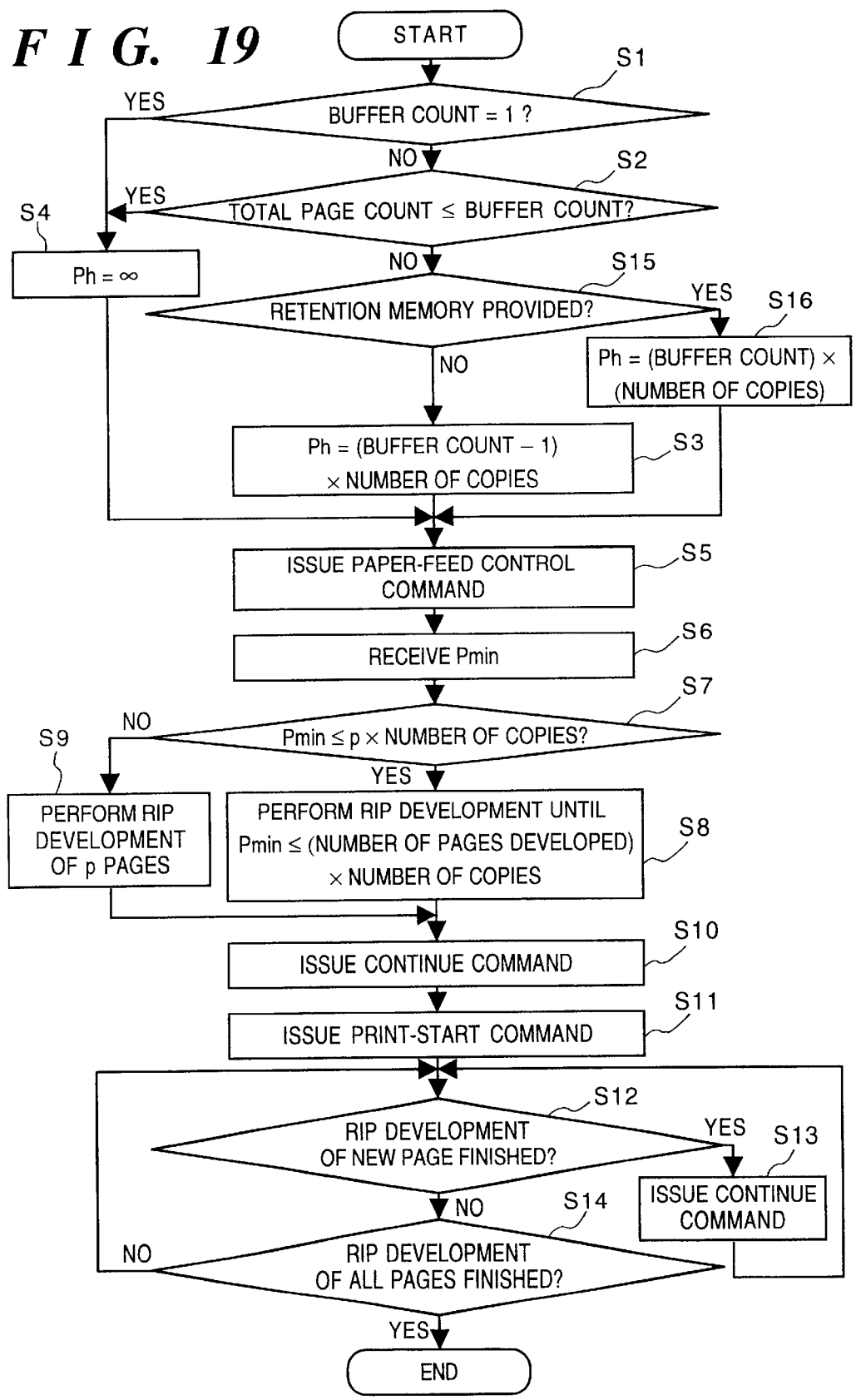
FIG. 19 is a flowchart illustrating an example of a printing sequence according to the second embodiment.

FIG. 19 is a flowchart showing an example of a printing sequence. This sequence is executed by the CPU 501 of the PDL controller 102 when printing is executed. This printing sequence differs from that of the first embodiment shown in FIG. 14 in the addition of steps S15 and S16.

At step S15, the PDL controller 102 determines, based upon the RM bit of the configuration response, whether the copier 103 is equipped with the retention memory. If the copier 103 has the retention memory, then the PDL controller 102 sets the desired minimum preparatory count Ph to (buffer count)×(number of copies) at step S16. If the copier 103 does not have the retention memory, the PDL controller 102 sets Ph to (buffer count−1) (number of copies) at step S3.

Thus, in accordance with this embodiment, effects similar to those of the first embodiment can be expected. In addition, the retention memory with which the copier is provided can be utilized effectively to perform continuous printing at high speed.

In accordance with the embodiments of the present invention described above, there are provided a highly efficient image processing apparatus and method, an image forming system as well as an image forming apparatus and method in which a printing job can be executed reliably through simple control even if the job is performed by a printer engine having a plurality of cassettes or a printer engine which feeds paper in advance, and in which total printing time can be shortened.

Further, there are provided an image processing apparatus and method, an image forming system as well as an image forming apparatus and method in which the image forming apparatus will not output blank sheets even if the controller fails to send the printer engine a stop command for some reason.

Furthermore, there are provided an image processing apparatus and method, an image forming system as well as an image forming apparatus and method in which highly efficient printing is made possible by allowing a continuous-printing operation to continue for as long as possible.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:
    developing means for developing image data, corresponding to an image to be formed, into a buffer memory which is capable of storing the developed image data for plural pages;
    forming means for forming an image conforming to the developed image data on a recording medium;
    an accommodation unit which is capable of accommodating a plurality of recording media;
    supply means for supplying the recording medium accommodated in said accommodation unit along a conveying path, which is capable of keeping a plurality of the recording media, to said forming means; and
    control means for controlling said supply means to supply at least one of the recording medium to the conveying path in advance of image formation by said forming means,
    wherein while image formation is performed by said forming means, said control means determines a number of the recording media to be supplied to the conveying path in accordance with a number of the pages stored in the buffer memory.

2. The apparatus according to claim 1, wherein said developing means comprising:
    generating means for generating the corresponding image data from given command data; and
    writing means for writing the image data, which have been generated by said generating means, in the buffer memory.

3. The apparatus according to claim 1, wherein said forming means forms an image by an electrophotographic process.

4. The apparatus according to claim 1, wherein said supply means includes:
   first holding means for holding the recording media to be supplied to said forming means; and
   second holding means, different from said first holding means, for holding the recording media to be supplied to said forming means.

5. The apparatus according to claim 1, wherein said control means includes:
   first generating means for generating a number of images developed by said developing means;
   second generating means for generating the number of recording media which have been supplied by said supply means; and
   comparing means for comparing the number of images generated by said first generating means and the number of recording media generated by said second generating means;
   wherein said control means controls said supply means in dependence upon results of comparison performed by said comparing means.

6. An image forming apparatus used together with an image processing apparatus having developing means for developing image data, corresponding to an image to be formed, into a buffer memory which is capable of storing the developed image data for plural pages, comprising:
   forming means for forming an image conforming to the developed image data on a recording medium;
   an accommodation unit which is capable of accommodating a plurality of recording media;
   supply means for supplying the recording medium accommodated in said accommodation unit along a conveying path, which is capable of keeping a plurality of the recording media, to said forming means; and
   control means for controlling said supply means to supply at least one of record medium to the conveying path in advance of image formation by said forming means,
   wherein while image forming is performed by said forming means, said control means determines a number of the recording media in dependence upon a number of the pages stored in the buffer memory.

7. The apparatus according to claim 6, wherein said forming means forms an image by an electrophotographic process.

8. The apparatus according to claim 6, wherein said supply means includes:
   first holding means for holding the recording media to be supplied to said forming means; and
   second holding means, different from said first holding means, for holding the recording media to be supplied to said forming means.

9. The apparatus according to claim 6, wherein said control means includes:
   first generating means for generating a number of images developed by said developing means;
   second generating means for generating the number of recording media which have been supplied by said supply means; and
   comparing means for comparing the number of images generated by said first generating means and the number of recording media generated by said second generating means;
   wherein said control means controls said supply means in dependence upon results of comparison performed by said comparing means.

10. An image processing apparatus used together with an image forming apparatus having forming means for forming an image on a recording medium conforming to image data, an accommodation unit which is capable of accommodating a plurality of recording media, supply means for supplying the recording medium accommodated in said accommodation unit along a conveying path, which is capable of keeping a plurality of the recording media, to said forming means, and control means for controlling said supply means to supply at least one of the recording medium to the conveying path in advance of image formation by said forming means comprising:
    developing means for developing image data, corresponding to an image to be formed, into a buffer memory which is capable of storing the developed image data for plural pages; and
    output means buffer outputting information, which indicates a number of the pages stored in the buffer memory, to said image forming apparatus,
    wherein while image formation is performed by said forming means, said control means determines a number of the recording media to be supplied to the conveying path in dependence upon the information output by said output means.

11. The apparatus according to claim 10, wherein said developing means comprising:
    generating means for generating the corresponding image data from given command data; and
    writing means for writing the image data, which have been generated by said generating means, in the buffer memory.

12. An image forming method comprising the steps of:
    developing image data, corresponding to an image to be formed, into a buffer memory which is capable of storing the developed image data for plural pages;
    forming an image conforming to the developed image data on a recording medium;
    supplying the recording medium from an accommodation unit, which is capable of accommodating a plurality of recording media, along a conveying path, which is capable of keeping a plurality of the recording media, used in later image formation;
    determining, while the image formation is performed, a number of the recording media to be supplied to the conveying path in accordance with a number of pages stored in the buffer memory; and
    controlling a supplement of the recording medium to supply at least one of the recording medium to the conveying path.

13. An image forming method for an image forming apparatus used together with an image processing apparatus having developing means for developing image data corresponding to an image to be formed, into a buffer memory which is capable of storing the developed image data for plural pages, the method comprising the steps of:
    forming an image on a recording medium conforming to the developed image data;
    supplying the recording medium from an accommodation unit, which is capable of accommodating a plurality of recording media, along a conveying path, which is capable of keeping a plurality of the recording media used in later image formation;

determining, while the image formation is performed, a number of the recording media to be supplied to the conveying path in accordance with a number of pages stored in the buffer memory; and controlling a supplement of the recording media to supply at least one of the recording medium to the conveying path.

14. A controlling method for an image processing apparatus used together with an image forming apparatus having forming means for forming an image on a recording medium conforming to image data, an accommodation unit which is capable of accommodating a plurality of recording media, supply means for supplying the recording medium accommodated in said accommodation unit along a conveying path, which is capable of keeping a plurality of the recording media, to said forming means, and control means for controlling said supply means to supply at least one of the recording medium to the conveying path, the method comprising the steps of:

developing image data, corresponding to an image to be formed, to a buffer memory which is capable of storing the developed image data for plural pages; and outputting information, which indicates a number of the pages stored in the buffer memory, to said image forming apparatus, wherein while image formation is performed by said forming means, said control means determines a number of the recording media to be supplied to the conveying path based on the received information.

* * * * *

UNITED STATES PATENT AND TRADEMARK OFFICE
CERTIFICATE OF CORRECTION

PATENT NO.   : 6,462,830 B1
DATED         : October 8, 2002
INVENTOR(S)  : Akira Negishi It is certified that error appears in the above-identified patent and that said Letters Patent is hereby corrected as shown below:

Title page,
Item [56], References Cited, FOREIGN PATENT DOCUMENTS, "JP 63251247 1/1988" should read -- JP 63-251247 1/1988 --.

Column 4,
Line 29, "paint" should read -- print --.

Column 6,
Line 16, "reversing g" should read -- reversing --; and "without t" should read -- without --.

Column 10,
Line 19, "is" (second occurrence) should be deleted.

Column 11,
Line 13, "Do" should read -- DO --;
Line 43, "a re" should read -- are --; and
Line 44, "us ed" should read -- used --.

Column 13,
Line 62, "ever" should read -- every --.

Column 14,
Line 8, "(this" should read -- (this is --; and
Line 10, "case" should read -- a case --.

Column 15,
Line 57, "at a" should read -- as a --.

Column 18,
Line 3, "(number" should read -- ×(number --.

UNITED STATES PATENT AND TRADEMARK OFFICE
CERTIFICATE OF CORRECTION

PATENT NO.   : 6,462,830 B1
DATED        : October 8, 2002
INVENTOR(S)  : Akira Negishi It is certified that error appears in the above-identified patent and that said Letters Patent is hereby corrected as shown below:

<u>Column 19,</u>
Line 36, "record" should read -- recording --.

<u>Column 20,</u>
Line 17, "buffer" should read -- for --.

Signed and Sealed this

Sixth Day of January, 2004

JAMES E. ROGAN
*Director of the United States Patent and Trademark Office*